US012186826B2

(12) United States Patent
Liang et al.

(10) Patent No.: US 12,186,826 B2
(45) Date of Patent: Jan. 7, 2025

(54) BED MESH COMBINATION DEVICE AND BED MESH COMBINATION METHOD

(71) Applicant: Guangzhou Lianrou Machinery & Equipment Co., Ltd., Guangzhou (CN)

(72) Inventors: Jie Liang, Guangzhou (CN); Zhiming Tan, Guangzhou (CN); Zhiliang Tan, Guangzhou (CN)

(73) Assignee: Guangzhou Lianrou Machinery & Equipment Co., Ltd., Guangdong (CN)

( * ) Notice: Subject to any disclaimer, the term of this patent is extended or adjusted under 35 U.S.C. 154(b) by 63 days.

(21) Appl. No.: 18/190,435

(22) Filed: Mar. 27, 2023

(65) Prior Publication Data

US 2024/0157466 A1 May 16, 2024

(30) Foreign Application Priority Data

Nov. 10, 2022 (CN) .......................... 202211403514.2
Nov. 10, 2022 (CN) .......................... 202211403607.5

(51) Int. Cl.
*B23K 20/10* (2006.01)
*B23K 31/02* (2006.01)
(Continued)

(52) U.S. Cl.
CPC .............. *B23K 20/10* (2013.01); *B23K 31/02* (2013.01); *B23K 31/10* (2013.01);
(Continued)

(58) Field of Classification Search
CPC ........................ B23K 20/10–106; B23K 31/02; B23K 31/10; B23K 37/0229; B23K 37/0247;
(Continued)

(56) References Cited

U.S. PATENT DOCUMENTS 4,439,977 A 4/1984 Stumpf
2008/0110574 A1 5/2008 Etoh

FOREIGN PATENT DOCUMENTS

CA 3199823 A1 * 5/2024 ............. B23K 20/10
CN 1344223 A 4/2002
(Continued)

OTHER PUBLICATIONS

Chinese Office Action for CN 2022114036075, dated Jan. 29, 2024. China National Intellectual Property Administration, Beijing, China.
(Continued)

*Primary Examiner* — Kiley S Stoner
(74) *Attorney, Agent, or Firm* — M&B IP Analysts, LLC

(57) ABSTRACT

A bed mesh combination device includes a feeding assembly movable in a first direction, two groups of welding cutter assemblies and a welding head assembly oppositely arranged in a second direction. The feeding assembly can lay a spring string on the welding cutter assembly, the welding cutter assembly includes a plurality of welding cutters extending in a third direction, the welding cutters of a same group are arranged at intervals along the first direction, the welding cutters of different groups are staggered in the first direction, the two groups of welding cutter assemblies respectively correspond to first and second welding positions of the spring string. The welding cutter assembly can push the spring string to move in the second direction, and the welding cutter assembly can reciprocate relative to the spring string in the third direction. The welding head assembly includes an ultrasonic welding head and a first driving member.

25 Claims, 25 Drawing Sheets

(51) Int. Cl.
*B23K 31/10* (2006.01)
*B23K 37/02* (2006.01)
*B23K 37/047* (2006.01)

(52) U.S. Cl.
CPC ...... *B23K 37/0229* (2013.01); *B23K 37/0247* (2013.01); *B23K 37/047* (2013.01)

(58) Field of Classification Search
CPC . B23K 37/047; B23K 1/06; B23K 37/04–053
USPC ........... 228/1.1, 110.1, 47.1, 49.1–49.2, 49.4
See application file for complete search history.

(56) References Cited

FOREIGN PATENT DOCUMENTS

| | | | | | |
|---|---|---|---|---|---|
| CN | 109158822 | A | * | 1/2019 | ........... B23K 37/047 |
| CN | 109175665 | A | * | 1/2019 | ............. B23K 20/10 |
| CN | 208822109 | U | | 5/2019 | |
| CN | 110464164 | A | | 11/2019 | |
| CN | 111820670 | A | | 10/2020 | |
| CN | 212094815 | U | | 12/2020 | |
| CN | 208452326 | U | | 2/2021 | |
| CN | 112453685 | A | * | 3/2021 | ............. B23K 20/10 |
| CN | 113319399 | A | * | 8/2021 | ............. B23K 20/10 |
| CN | 113441661 | A | * | 9/2021 | |
| CN | 113478158 | A | * | 10/2021 | |
| CN | 114406679 | A | * | 4/2022 | |
| CN | 217019005 | U | | 7/2022 | |
| CN | 115582614 | A | * | 1/2023 | |
| CN | 114406679 | B | * | 8/2023 | |
| DE | 10163137 | A1 | * | 7/2002 | ......... B23K 37/0443 |
| KR | 101133251 | B1 | * | 4/2012 | |
| WO | WO-9609134 | A1 | * | 3/1996 | ............. B23K 20/10 |
| WO | 2014113737 | A1 | | 7/2014 | |

OTHER PUBLICATIONS

International Search Report for PCT/CN2022/11403607.5, dated Jan. 1, 2024. Searching Authority China National Intellectual Property Administration, Beijing, China.

* cited by examiner

BED MESH COMBINATION DEVICE AND BED MESH COMBINATION METHOD

CROSS-REFERENCE TO RELATED APPLICATIONS

This application is based on and claims the benefit of priority from Chinese Patent Applications No. 202211403607.5 and No. 202211403514.2, filed on 10 Nov. 2022, which are incorporated by reference herein in their entirety.

TECHNICAL FIELD

The present invention relates to the field of automatic production of mattresses, and particularly to a bed mesh combination device and a bed mesh combination method.

BACKGROUND

Bagged spring bed mesh is a main component of a bagged spring mattress. In the past, the bagged spring bed mesh was usually formed by bonding a plurality of spring strings side by side, and the spring strings were sequentially connected by a plurality of bagged springs. At present, the bonding of the bagged spring bed mesh is mainly completed by spraying hot melt adhesive and then extruding and fixing. In addition to consuming a lot of adhesive, the bonding method also has some problems, such as a long preheating time of the hot melt adhesive, an expensive adhesive box which needs to be regularly cleaned, and easy pollution of workstation by overflowing hot melt adhesive.

For an adhesive-free bed mesh disclosed in the existing technology, adjacent spring strings are welded together by ultrasonic welding or hot melt welding, which can avoid the use of the hot melt adhesive. At present, there are the following two common welding processes for the adhesive-free bed mesh:

1) Firstly, two spring strings are welded together through a first welding position to form a composite spring string, then the composite spring string is cut into double-row spring strings corresponding to the size of the bed mesh, and the double-row spring strings are welded together through a second welding position. When the double-row spring strings are welded, since a welding apparatus needs to be inserted between two rows of spring strings, hot melt welding methods such as electric heating or spot welding are often used, with the problems of unstable welding point and loose bed mesh. Moreover, two different welding devices need to be provided for this process, and the steps of cutting, arranging and the like also need to be executed between two weldings, so that the working procedures are complicated and the production efficiency is low.
2) One spring string is cut into single-row spring strings corresponding to the size of the bed mesh, then the single-row spring strings are sequentially fed to a welding station, and a welding cutter located at the welding station changes a position back and forth in a length direction of the spring string, is inserted into one welding position of the spring string for welding first, and then is drawn out and inserted into the next welding position for welding. An ultrasonic welding method is used in this process, but the process of inserting the welding cutter into the bed mesh easily leads to the damage of a packaging bag of the bagged spring, thus reducing the production quality of the bed mesh. The single-row spring strings need to be fed manually or semi-automatically, leading to the reduction of the production efficiency.

SUMMARY

The disclosure aims to solve at least one of the technical problems in the existing technology, and the disclosure provides a bed mesh combination device with a simpler production process, which can improve production efficiency and product quality of a bed mesh.

The disclosure further provides a bed mesh combination method, in which spring strings are combined into an adhesive-free bed mesh through the bed mesh combination device above.

According to an embodiment in a first aspect of the disclosure, a bed mesh combination device is provided, which comprises:

a feeding assembly, wherein the feeding assembly is capable of moving in a first direction, the feeding assembly is configured for conveying a spring string, and the spring string comprises a plurality of bagged springs sequentially connected;

a welding cutter assembly, wherein the welding cutter assembly and the feeding assembly are oppositely arranged in a second direction, the feeding assembly is capable of laying the spring string on the welding cutter assembly, the welding cutter assembly comprises a plurality of welding cutters, the welding cutters extend in a third direction, two groups of welding cutter assemblies are provided, the welding cutters of a same group are arranged at intervals along the first direction, the welding cutters of different groups are staggered in the first direction, the two groups of welding cutter assemblies are respectively used to correspond to a first welding position and a second welding position of the spring string, the welding cutter assembly is capable of pushing the spring string to move in the second direction, and the welding cutter assembly is capable of being reciprocating relative to the spring string in the third direction; and a welding head assembly, wherein the welding head assembly comprises an ultrasonic welding head and a first driving member, and the first driving member is configured for driving the ultrasonic welding head to reciprocate relative to the welding cutter in the second direction, so that the ultrasonic welding head and the welding cutter are capable of cooperating to complete welding.

The bed mesh combination device at least has the following beneficial effects. During welding, the second group of welding cutter assembly pushes the odd-numbered row of spring string to the welding station first, so that the first welding position corresponds to the first group of welding cutter assembly waiting at the welding station, the feeding assembly lays the even-numbered row of spring string on the odd-numbered row of spring string, and the ultrasonic welding heads are pressed towards the first group of welding cutter assembly to weld the two rows of spring strings, then the first group of welding cutter assembly pushes the even-numbered row of spring string to the welding station, so that the second welding position corresponds to the second group of welding cutter assembly waiting at the welding station, the feeding assembly lays the odd-numbered row of spring string on the even-numbered row of spring string, and the ultrasonic welding heads are pressed towards the first group of welding cutter assembly to weld the two rows of spring strings. The feeding assembly can feed automatically, and the first welding position and the second welding position respectively correspond to the two groups of welding cutter assemblies by pushing, which can reduce a risk of packaging bag damage during welding and improve production quality of the bed mesh.

In the bed mesh combination device according to the embodiment in the first aspect of the disclosure, at least one of the welding head assemblies is arranged on a side surface of the feeding assembly along the first direction, and the welding head assembly is capable of moving in the first direction.

In the bed mesh combination device according to the embodiment in the first aspect of the disclosure, the welding head assembly is provided in two groups, and the two groups of welding head assemblies are respectively arranged on two sides of the feeding assembly along the first direction.

In the bed mesh combination device according to the embodiment in the first aspect of the disclosure, the bed mesh combination device comprises a first track, the first track extends along the first direction, the welding head assembly and the feeding assembly are mounted on the first track, and an interval between a plurality of welding head assemblies located on a same side of the feeding assembly is adjustable.

In the bed mesh combination device according to the embodiment in the first aspect of the disclosure, the welding head assembly and the feeding assembly are located on a same side of the welding cutter assembly in the second direction, a plurality of ultrasonic welding heads are arranged at intervals along the first direction, and the welding head assembly is capable of moving in the third direction to avoid the feeding assembly. In the bed mesh combination device according to the embodiment in the first aspect of the disclosure, the bed mesh combination device comprises a first track, the first track extends along the first direction, the welding head assembly is mounted on the first track, the welding head assembly comprises a plurality of first mounting seats, the first mounting seats and the first driving members are in one-to-one correspondence to the ultrasonic welding heads, the plurality of first mounting seats are mounted on the first track at intervals, the first driving member and the ultrasonic welding head are mounted on the corresponding first mounting seat, an interval between the ultrasonic welding heads is adjustable, and the first driving members are respectively configured for driving the corresponding ultrasonic welding head to reciprocate relative to from the welding cutter.

In the bed mesh combination device according to the embodiment in the first aspect of the disclosure, the welding head assembly comprises a first mounting seat, a plurality of ultrasonic welding heads are mounted on the first mounting seats at intervals along the first direction, an interval between the ultrasonic welding heads is adjustable, and the first driving member is configured for driving the ultrasonic welding heads to reciprocate relative to the welding cutter.

In the bed mesh combination device according to the embodiment in the first aspect of the disclosure, the bed mesh combination device comprises an eighth driving member, a fifth track and a fifth mounting seat, the fifth track extends along the third direction, the fifth mounting seat is mounted on the fifth track, the eighth driving member is capable of driving the fifth mounting seat to move along the fifth track, and the welding head assembly is movably mounted on the fifth mounting seat.

In the bed mesh combination device according to the embodiment in the first aspect of the disclosure, the bed mesh combination device comprises a fifth driving member, and the fifth driving member is configured for driving the welding head assembly to move along the first direction, so that the ultrasonic welding head is capable of complete welding at different positions.

In the bed mesh combination device according to the embodiment in the first aspect of the disclosure, the feeding assembly comprises a fourth driving member and conveying members, the conveying members are arranged at intervals in the first direction or the third direction in pairs, a conveying channel is formed between the paired conveying members, at least one of the conveying members is an active member, the active member comprises at least one of a ratchet, a roller or a conveyor belt, and the fourth driving member is configured for driving the active member to convey the spring string.

In the bed mesh combination device according to the embodiment in the first aspect of the disclosure, the feeding assembly comprises a limiting member, the limiting member extends in the second direction, and the limiting member and the conveying member jointly form the conveying channel.

In the bed mesh combination device according to the embodiment in the first aspect of the disclosure, the bed mesh combination device comprises a second driving member and a third driving member, the second driving member is configured for driving the welding cutter assembly to move along the second direction, and the third driving member is configured for driving the welding cutter assembly to move along the third direction.

In the bed mesh combination device according to the embodiment in the first aspect of the disclosure, an interval between the welding cutters is adjustable.

In the bed mesh combination device according to the embodiment in the first aspect of the disclosure, the welding cutter assembly comprises a fourth mounting seat, one end of the welding cutter is mounted on the fourth mounting seat, the bed mesh combination device comprises a supporting member, the supporting member is located on an opposite side of a welding surface of the welding cutter, and the supporting member is configured for supporting the other end of the welding cutter.

In the bed mesh combination device according to the embodiment in the first aspect of the disclosure, a convex surface oriented to the ultrasonic welding head is formed on the welding cutter, and the convex surface is configured for better fitting the welding cutter deformed by a force with the ultrasonic welding head.

In the bed mesh combination device according to the embodiment in the first aspect of the disclosure, the bed mesh combination device comprises a discharging assembly, the discharging assembly comprises a receiving member, the receiving member is located at an opposite side of a welding surface of the welding cutter in the second direction, and the receiving member is configured for receiving the spring string sent by the welding cutter assembly.

In the bed mesh combination device according to the embodiment in the first aspect of the disclosure, the bed mesh combination device further comprises a guiding member, the guiding member is arranged on the welding cutter assembly or on the discharging assembly, the guiding member comprises a guiding inclined plane, the guiding inclined plane is inclined to an end surface of the bagged spring in the spring string, and the guiding member is configured for arranging and aligning the spring string in the first direction, and guiding the spring string to move in the second direction.

In the bed mesh combination device according to the embodiment in the first aspect of the disclosure, the discharging assembly comprises two groups of receiving members, the bed mesh combination device comprises two groups of guiding members, the two groups of receiving members are arranged at an interval in the third direction, a receiving channel is formed between the two groups of receiving members, the two groups of guiding members are oppositely arranged in the third direction, the guiding inclined plane is partially or wholly located on one side of the welding surface of the welding cutter in the third direction, the two groups of guiding members form a guiding channel with a gradually reduced cross-sectional area, and the guiding member is configured for guiding the spring string to enter the receiving channel.

In the bed mesh combination device according to the embodiment in the first aspect of the disclosure, the two groups of welding cutter assemblies are respectively located on two sides of the discharging assembly in the third direction, or the two groups of welding cutter assemblies are located on a same side of the discharging assembly in the third direction.

According to an embodiment in a second aspect of the disclosure, a bed mesh combination method is provided, in which spring strings are combined into an adhesive-free bed mesh through the bed mesh combination device above, and the bed mesh combination method comprises the following steps:

step 100: making the feeding assembly move along the first direction, and laying a first row of spring string on a first group of welding cutters;

step 200: making a second group of welding cutters move to one side of an odd-numbered row of spring string facing towards the feeding assembly and then move along the second direction, and driving the odd-numbered row of spring string to reach a welding station;

step 300: making the feeding assembly move along the first direction, laying an even-numbered row of spring string on the odd-numbered row of spring string, in the process, sequentially pressing the ultrasonic welding heads towards the first group of welding cutters, and welding first welding positions of the even-numbered row of spring string and the odd-numbered row of spring string by the ultrasonic welding heads and the first group of welding cutters;

step 400: drawing out the first group of welding cutters from the spring strings;

step 500: making the first group of welding cutters move to one side of the even-numbered row of spring string facing towards the feeding assembly and then move along the second direction, and driving the even-numbered row of spring string to reach the welding station;

step 600: making the feeding assembly move along the first direction, laying the odd-numbered row of spring string on the even-numbered row of spring string, in the process, sequentially pressing the ultrasonic welding heads towards the second group of welding cutters, and welding second welding positions of the odd-numbered row of spring string and the even-numbered row of spring string by the ultrasonic welding heads and the second group of welding cutters;

step 700: drawing out the second group of welding cutters from the spring strings; and repeating the step 200 to the step 700, until the spring strings are welded into the bed mesh with a predetermined size.

The bed mesh combination device above is used in the bed mesh combination method. Therefore, the bed mesh combination method in the embodiment of the disclosure has the beneficial effects brought by the bed mesh combination device, which will not be repeated herein.

In the bed mesh combination method according to the embodiment in the second aspect of the disclosure, before the step 100, the method further comprises step 10: adjusting the first group of welding cutters, so that the first group of welding cutters correspond to the first welding positions of the spring string in the first direction; and adjusting the second group of welding cutters, so that the second group of welding cutters correspond to the second welding positions of the spring string in the first direction, and in subsequent welding steps, positions of the welding cutters in the first direction remain unchanged.

According to an embodiment in a third aspect of the disclosure, a bed mesh combination method is provided, in which spring strings are combined into an adhesive-free bed mesh through the bed mesh combination device above, and the bed mesh combination method comprises the following steps:

step 100: making the feeding assembly move along the first direction, and laying a first row of spring string on a first group of welding cutters;

step 200: making a second group of welding cutters move to one side of an odd-numbered row of spring string facing towards the feeding assembly and then move along the second direction, and driving the odd-numbered row of spring string to reach a welding station;

step 300: making the feeding assembly move along the first direction, and laying an even-numbered row of spring string on the odd-numbered row of spring string;

step 400: making the welding head assembly move to a position corresponding to the first group of welding cutters in the first direction, pressing the ultrasonic welding heads towards the first group of welding cutters along the second direction, and welding first welding positions of the even-numbered row of spring string and the odd-numbered row of spring string by the ultrasonic welding heads and the first group of welding cutters;

step 500: drawing out the first group of welding cutters from the spring strings;

step 600: making the first group of welding cutters move to one side of the even-numbered row of spring string facing towards the feeding assembly and then move along the second direction, and driving the even-numbered row of spring string to reach the welding station;

step 700: making the feeding assembly move along the first direction, and laying the odd-numbered row of spring string on the even-numbered row of spring string;

step 800: making the welding head assembly move to a position corresponding to the second group of welding cutters in the first direction, pressing the ultrasonic welding heads towards the second group of welding cutters along the second direction, and welding second welding positions of the odd-numbered row of spring string and the even-numbered row of spring string by the ultrasonic welding heads and the second group of welding cutters;

step 900: drawing out the second group of welding cutters from the spring strings; and repeating the step 200 to the step 900, until the spring strings are welded into the bed mesh with a predetermined size.

In bed mesh combination device above is used in the bed mesh combination method. Therefore, the bed mesh combination method in the embodiment of the disclosure has the beneficial effects brought by the bed mesh combination device, which will not be repeated herein.

In the bed mesh combination method according to the embodiment in the third aspect of the disclosure, before the step 100, the method further comprises step 10: adjusting the first group of welding cutters, so that the first group of welding cutters correspond to the first welding positions of the spring string in the first direction; and adjusting the second group of welding cutters, so that the second group of welding cutters correspond to the second welding positions of the spring string in the first direction, and in subsequent welding steps, positions of the welding cutters in the first direction remain unchanged.

In the bed mesh combination method according to the embodiment in the third aspect of the disclosure, before the welding head assembly moves in the first direction, the welding head assembly moves to a working region along the third direction, and after completing welding, the welding head assembly moves to an avoidance region along the third direction.

In the bed mesh combination method according to the embodiment in the third aspect of the disclosure, when a number of the ultrasonic welding heads is less than that of the first group of welding cutters, the step 400 is repeatedly executed to complete welding of all the first welding positions, and when the number of the ultrasonic welding heads is less than that of the second group of welding cutters, the step 800 is repeatedly executed to complete welding of all the second welding positions.

The additional aspects and advantages of the disclosure will be given in part in the following description, and will become apparent in part from the following description, or will be learned through the practice of the disclosure.

BRIEF DESCRIPTION OF THE DRAWINGS

The disclosure is further described hereinafter with reference to the drawings and embodiments.

Figure 1:
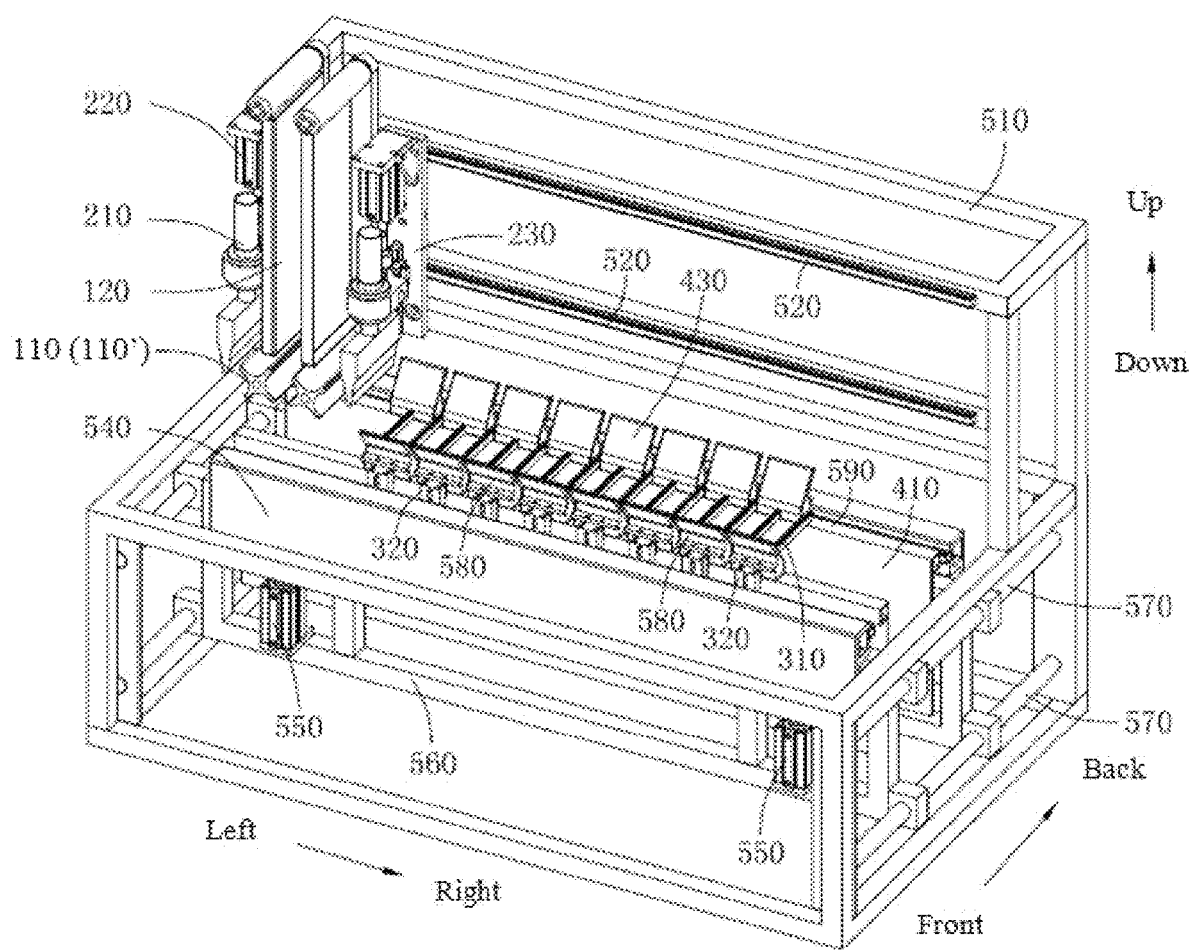
FIG. 1 is a schematic structural diagram of a bed mesh combination device according to an embodiment of the disclosure.

REFERENCE NUMERALS 100 refers to feeding assembly, 110 refers to conveying member, 110' refers to active member, 120 refers to limiting member,
200 refers to welding head assembly, 210 refers to ultrasonic welding head, 220 refers to first driving member, 230 refers to first mounting seat, 240 refers to connecting rod,
300 refers to welding cutter assembly, 310 refers to welding cutter, 311 refers to first welding cutter, 312 refers to second welding cutter, 320 refers to fourth mounting seat, 330 refers to fourth track,
400 refers to discharging assembly, 410 refers to receiving member,
510 refers to rack, 520 refers to first track, 530 refers to second track, 540 refers to second mounting seat, 550 refers to second driving member, 560 refers to third mounting seat, 570 refers to third track, 580 refers to guiding member, 590 refers to supporting member, 610 refers to fifth track, 620 refers to fifth mounting seat,
900 refers to spring string, 910 refers to first welding position, and 920 refers to second welding position.

DETAILED DESCRIPTION

Embodiments of the disclosure will be described in detail hereinafter, and examples of the embodiments are shown in the drawings, wherein the same or similar reference numerals throughout the drawings denote the same or similar elements or elements having the same or similar functions. The embodiments described hereinafter with reference to the drawings are exemplary and are only intended to explain the disclosure, but should not be construed as limiting the disclosure.

In the description of the disclosure, it should be understood that the orientation or position relationship indicated by the terms "center", "longitudinal", "transverse", "length", "width", "thickness", "up", "down", "front", "rear", "left", "right", "vertical", "horizontal", "top", "bottom", "inside", "outside", "axial", "radial", "circumferential", and the like is based on the orientation or position relationship shown in the drawings, it is only for the convenience of description of the disclosure and simplification of the description, and it is not to indicate or imply that the indicated device or element must have a specific orientation, and be constructed and operated in a specific orientation. Therefore, the terms should not be understood as limiting the disclosure. In addition, the features defined by "first" and "second" may explicitly or implicitly comprise one or more of the features. In the description of the disclosure, unless otherwise specified, the term "multiple" refers to being two or more.

In the description of the disclosure, it should be noted that the terms "installation", "interconnection" and "connection" should be understood in a broad sense unless otherwise specified and defined. For example, they may be fixed connection, removable connection or integrated connection; may be mechanical connection or electrical connection; and may be direct connection, or indirect connection through an intermediate medium, or connection inside two elements. The specific meanings of the above terms in the disclosure may be understood in a specific case by those of ordinary skills in the art.

Figure 4:
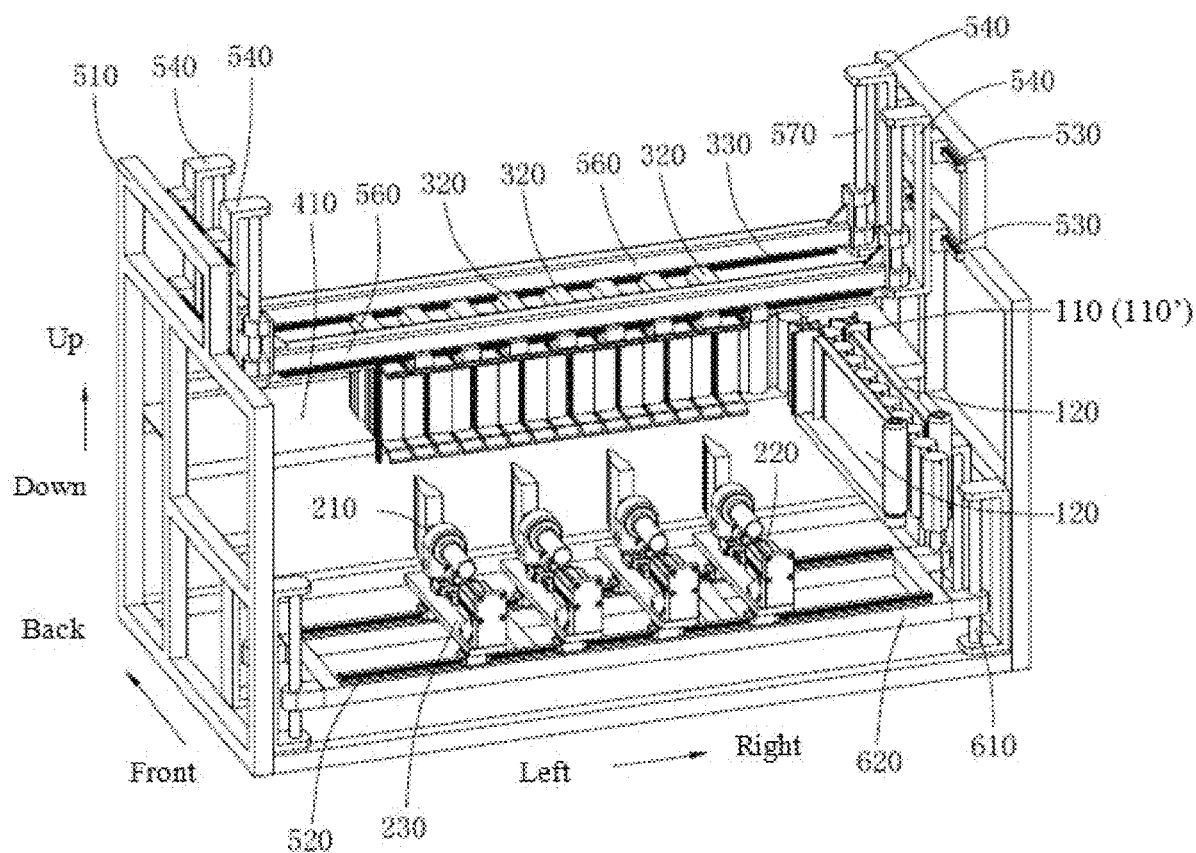
FIG. 4 is a schematic structural diagram of a bed mesh combination device according to an embodiment of the disclosure.

With reference to FIG. 1 and FIG. 4, an embodiment of the disclosure provides a bed mesh combination device, which comprises a feeding assembly 100, a welding cutter assembly 300 and a welding head assembly 200.

The feeding assembly 100 is capable of moving in a first direction (a left-right direction shown in FIG. 1 and FIG. 4), the feeding assembly 100 is configured for conveying a spring string 900, and the spring string 900 comprises a plurality of bagged springs sequentially connected.

The welding cutter assembly 300 and the feeding assembly 100 are oppositely arranged in a second direction (an up-down direction shown in FIG. 1, and a front-back direction shown in FIG. 4), the feeding assembly 100 is capable of laying the spring string 900 on the welding cutter assembly 300, the welding cutter assembly 300 comprises a plurality of welding cutters 310, the welding cutters 310 extend in a third direction (a front-back direction shown in FIG. 1, and an up-down direction shown in FIG. 4), two groups of welding cutter assemblies 300 are provided, the welding cutters 310 of the same group are arranged at intervals along the first direction, the welding cutters 310 of different groups are staggered in the first direction, the two groups of welding cutter assemblies 300 are respectively used to correspond to a first welding position 910 and a second welding position 920 of the spring string 900, the welding cutter assembly 300 is capable of pushing the spring string 900 to move in the second direction, and the welding cutter assembly 300 is capable of reciprocating relative to the spring string 900 in the third direction.

The welding head assembly 200 comprises an ultrasonic welding head 210 and a first driving member 220, and the first driving member 220 is configured for driving the ultrasonic welding head 210 to reciprocate relative to the welding cutter 310 in the second direction, so that the ultrasonic welding head 210 and the welding cutter 310 are capable of cooperating to complete welding.

Figure 2:
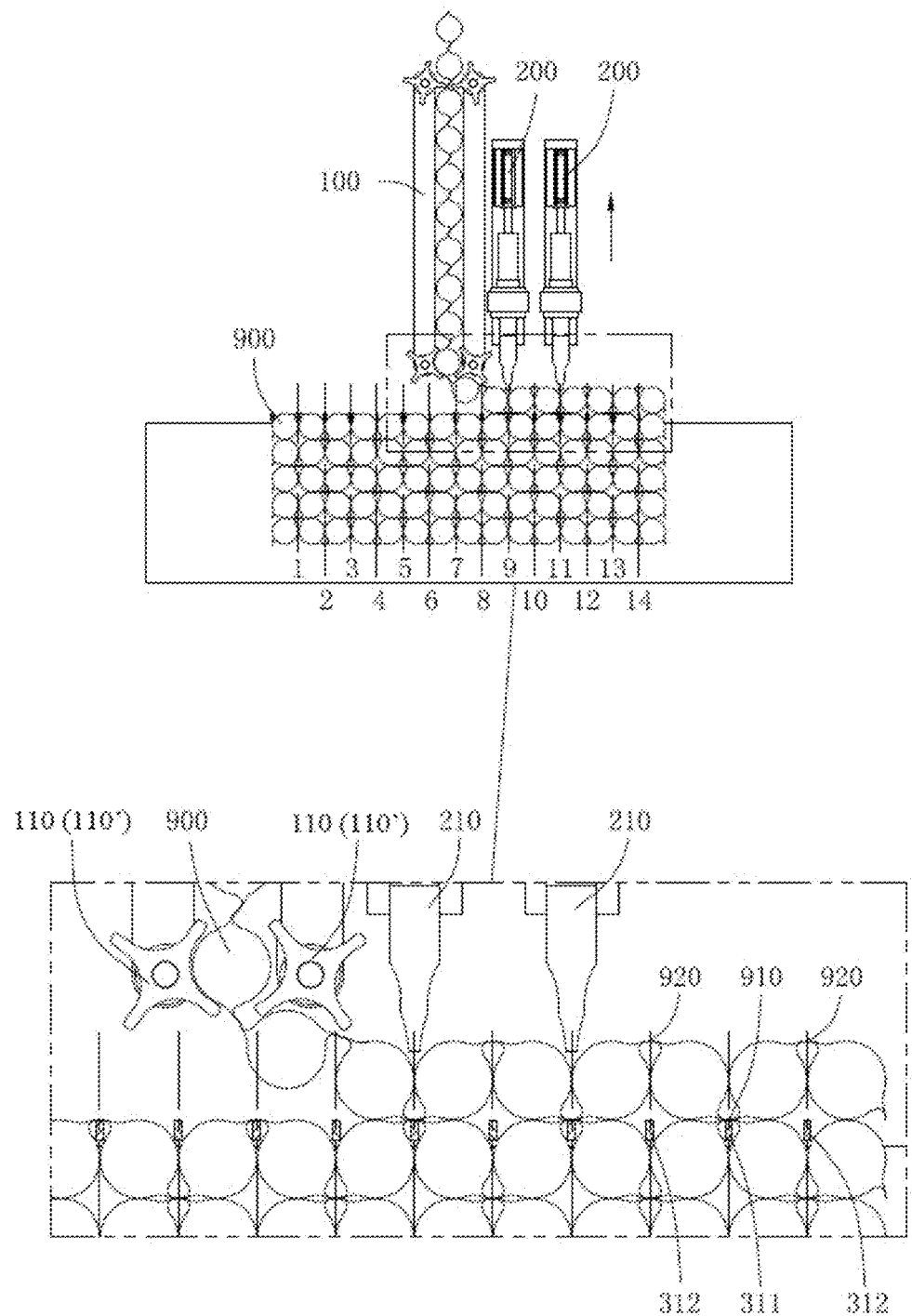
FIG. 2 is a principle diagram of the bed mesh combination device according to the embodiment of the disclosure when executing a bed mesh combination method.
Figure 5:
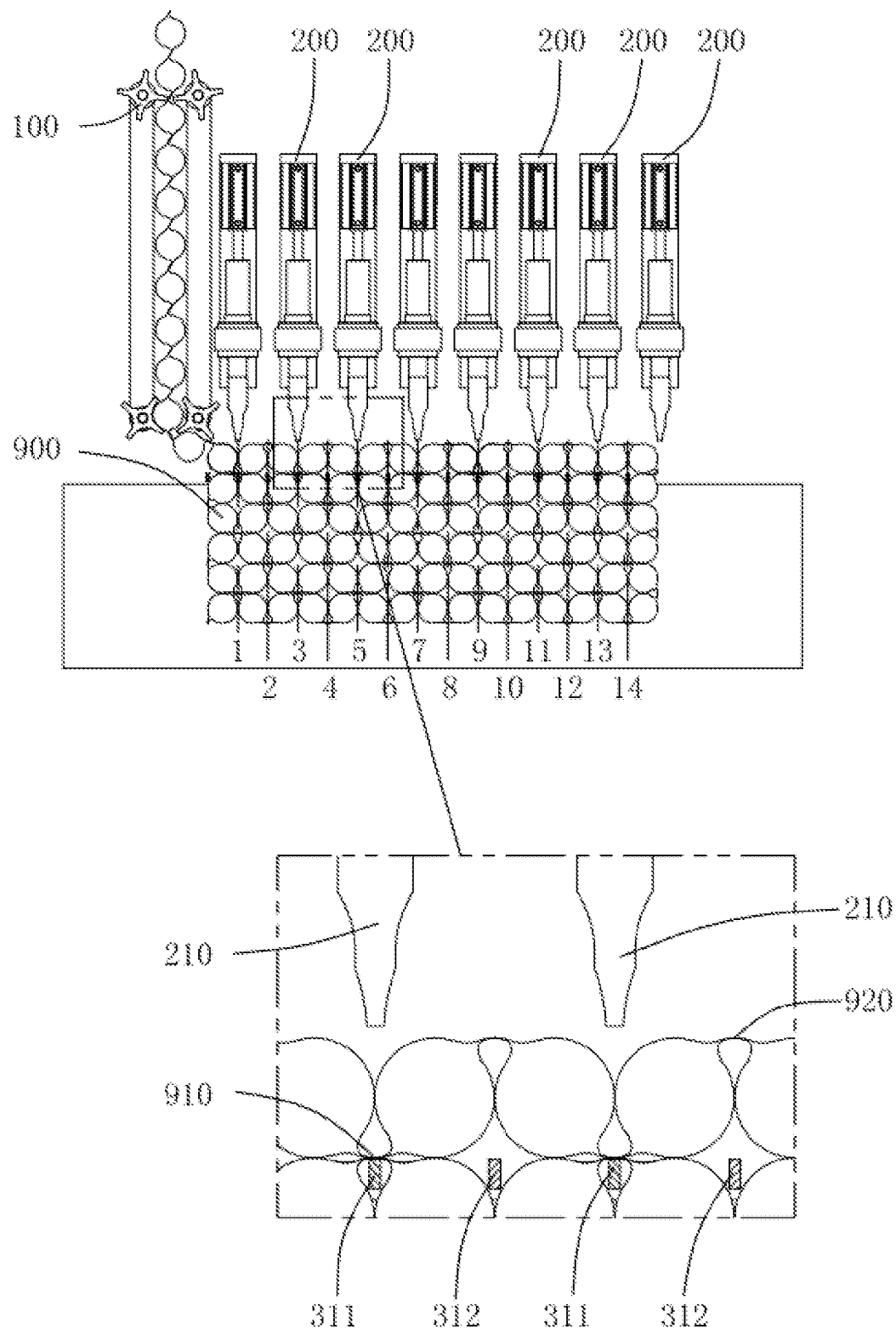
FIG. 5 is a principle diagram of the bed mesh combination device according to the embodiment of the disclosure when executing the bed mesh combination method.
Figure 25:
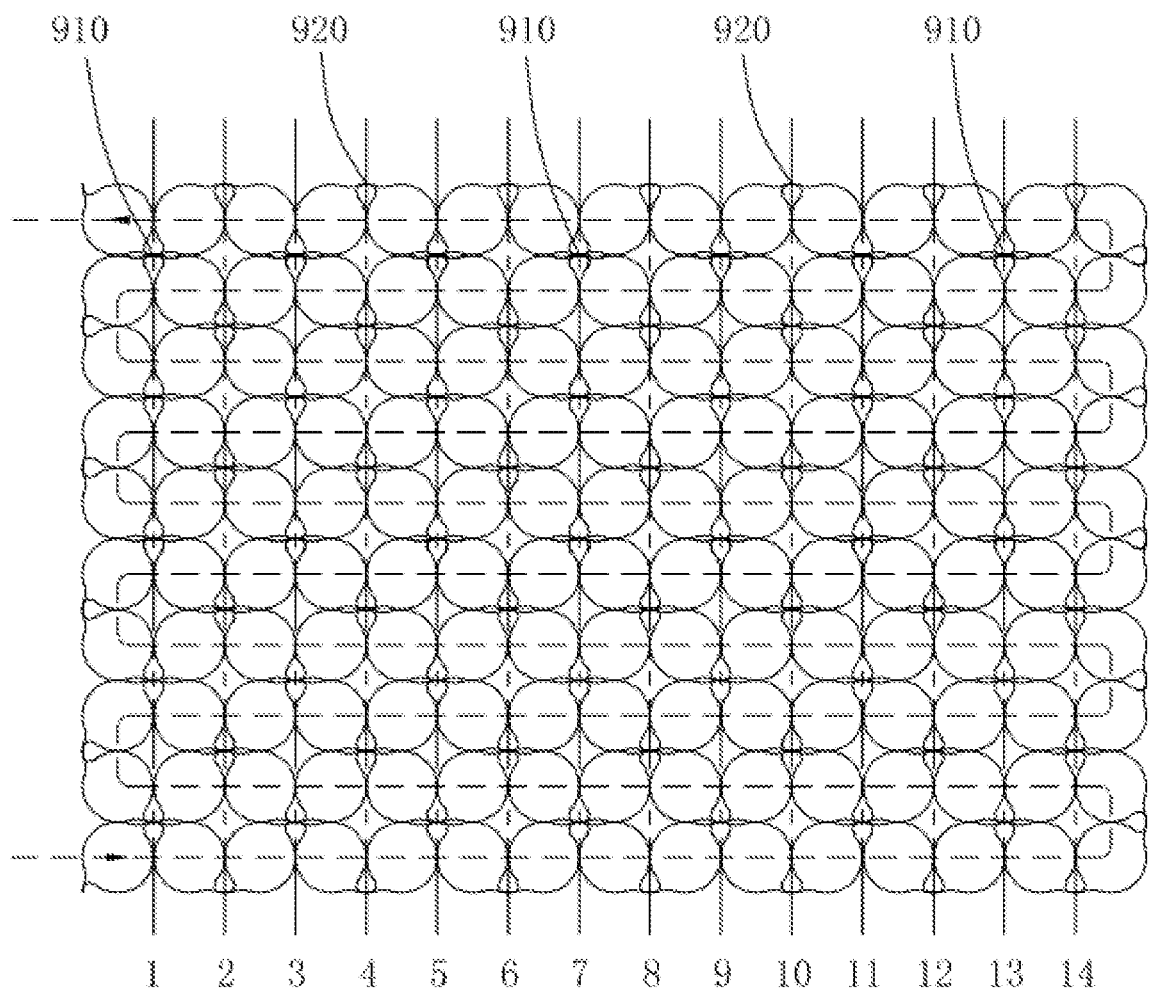
FIG. 25 is a schematic diagram of a bed mesh obtained by welding through the bed mesh combination method executed by the bed mesh combination device according to the embodiment of the disclosure.

Further, with reference to FIG. 2, FIG. 5 and FIG. 25, in FIG. 2, FIG. 5 and FIG. 25, welding positions in each row of spring string 900 are identified by indicator lines with numerical numbers, and a laying sequence of the spring strings 900 in the bed mesh is also identified by an indicator line with arrows in FIG. 25. As shown in FIG. 2, FIG. 5 and FIG. 25, in one row of spring string 900, the welding positions may be further divided into a first welding position 910 (which is namely a welding position identified by an even-numbered indicator line) and a second welding position 920 (which is namely a welding position identified by an odd-numbered indicator line). The first welding position 910 and the second welding position 920 alternate with each other, a first row of spring string 900 and a second row of spring string 900 are welded together through the first welding position 910, and the second row of spring string 900 and a third row of spring string 900 are welded together through the second welding position 920.

In the disclosure, two groups of welding cutter assemblies 300 respectively correspond to the first welding position 910 and the second welding position 920 of the spring string 900. During welding, the welding cutter 310 (hereinafter defined as a first welding cutter 311) of the first group of welding cutter assembly 300 corresponds to the first welding position 910 first, the feeding assembly 100 lays the even-numbered row of spring string 900 on the odd-numbered row of spring string 900, the ultrasonic welding head 210 is pressed towards a welding station, and the ultrasonic welding head 210 and the first welding cutter 311 clamp and weld the first welding positions 910 of the two rows of spring strings 900 together. Then, the welding cutter 310 (hereinafter defined as a second welding cutter 312) of the second group of welding cutter assembly 300 corresponds to the second welding position 920, the feeding assembly 100 lays the odd-numbered row of spring string 900 on the even-numbered row of spring string 900, the ultrasonic welding head 210 is pressed towards a welding station, and the ultrasonic welding head 210 and the second welding cutter 312 clamp and weld the second welding positions 920 of the two rows of spring strings 900 together.

The two groups of welding cutter assemblies 300 alternately cooperate with the ultrasonic welding heads 210 to complete welding, thus improving production efficiency of the adhesive-free bed mesh.

It can be understood that, in the disclosure, the "welding station" refers to a region where the spring string 900 is welded by the ultrasonic welding head 210 and the welding cutter 310. One group of welding cutter assembly 300 participating in welding may wait at the welding station, the other group of welding cutter assembly 300 may push the newly laid spring string 900 to reach the welding station in the second direction, and push the welded spring string 900 away from the welding station at the same time, and then the ultrasonic welding head 210 is pressed towards the welding cutter 310 participating in welding for welding. According to the disclosure, the first welding position 910 and the second welding position 920 respectively correspond to the two groups of welding cutter assemblies 300 by pushing, and welding at different welding positions is realized by switching the welding cutter assembly 300 responsible for pushing the spring string 900 and the welding cutter assembly 300 waiting at the welding station. Compared with welding at different welding positions by repeatedly inserting and drawing out the welding cutter 310 in the existing technology, a packaging bag with a bagged spring is less likely to be damaged, thus improving production quality of the bed mesh.

The welding head assembly 200 may have different embodiments. With reference to FIG. 1, in some possible embodiments, at least one welding head assembly 200 is arranged on a side surface of the feeding assembly 100 along the first direction, and the welding head assembly 200 is capable of moving in the first direction. With reference to FIG. 4, in other possible embodiments, the welding head assembly 200 and the feeding assembly 100 are located on the same side of the welding cutter assembly 300 in the second direction, a plurality of ultrasonic welding heads 210 are arranged at intervals along the first direction, and the welding head assembly 200 is capable of moving in the third direction to avoid the feeding assembly 100.

Firstly, with reference to FIG. 1, in such embodiment, the welding head assembly 200 has a design of "parallel-type", the "parallel-type" refers to that the welding head assembly 200 moves in the first direction along with the feeding assembly 100, and laying of one row of spring string 900 and welding of the one row of spring string 900 are performed in parallel. In some possible embodiments, a feeding module may further comprise a seventh driving member (not shown in the figure), and the feeding assembly 100 and the welding head assembly 200 are driven to move synchronously by the seventh driving member. Certainly, the feeding assembly 100 and the welding head assembly 200 may also be driven by different driving members, moving speeds of the feeding assembly 100 and the welding head assembly 200 may be consistent or different as long as the welding head assembly 200 can move along with the feeding assembly 100, and the feeding assembly 100 and the welding head assembly 200 do not interfere with each other.

In some possible embodiments, all welding head assemblies 200 are arranged on one side of the feeding assembly 100 along the first direction. For example, with reference to FIG. 2, the welding head assembly 200 is located on a right side of the feeding assembly 100. The welding head assembly 200 can weld the spring string 900 when the feeding assembly 100 moves from right to left. After one row of spring string 900 is laid, the feeding assembly 100 needs to return to a right end of the bed mesh combination device before laying the next row of spring string 900.

With reference to FIG. 1, in other possible embodiments, there are two groups of the welding head assemblies 200, and the two groups of welding head assemblies 200 are respectively arranged on two sides of the feeding assembly 100 along the first direction. When the feeding assembly 100 moves from left to right, the welding head assembly 200 located on a left side of the feeding assembly 100 can weld the spring string 900, and when the feeding assembly 100 moves from right to left, the welding head assembly 200 located on a right side of the feeding assembly 100 can weld the spring string 900, thus improving laying efficiency of the spring string 900. Moreover, in such embodiment, each row of spring string 900 may be continuously supplied without cutting before laying, thus improving production efficiency of a bagged spring mattress.

In addition, in order to improve production efficiency of an adhesive-free bed mesh, in some possible embodiments, one group of welding head assembly 200 comprises a plurality of welding head assemblies 200. For example, in the embodiment of FIG. 2, each group of welding head assembly 200 comprises two welding head assemblies 200, and the welding head assemblies 200 may weld two welding positions at the same time. Certainly, as shown in the embodiment of FIG. 1, each group of welding head assembly 200 comprises one welding head assembly 200.

Then, with reference to FIG. 4, in such embodiments, the welding head assembly 200 has a design of "non-parallel-type", and the "non-parallel-type" refers to that the feeding assembly 100 sequentially lays each row of spring string 900, and in the laying process, the welding head assembly 200 avoids the feeding assembly 100 in the third direction, and from the second row of spring string 900, after each row of spring string 900 is laid, the welding head assembly 200 and the welding cutter assembly 300 weld the laid spring string 900 and a previous row of spring string 900 together.

Compared with the design of "parallel-type", in the design of "non-parallel-type", the feeding assembly 100 can continuously lay one row of spring string 900, and the welding head assembly 200 may weld after laying one row of spring string 900, thus improving the production efficiency of the adhesive-free bed mesh.

In some possible embodiments, the first driving member 220 may be an air cylinder, a hydraulic cylinder or a motor for driving the ultrasonic welding head 210 to move. The first driving member 220 may be connected with the ultrasonic welding head 210 in different ways. For example, in the embodiment of FIG. 4, an output end of the first driving member 220 can move along the second direction, and the ultrasonic welding head 210 is fixedly connected with the output end. However, in other possible embodiments, the output end of the first driving member 220 can rotate, the ultrasonic welding head 210 is connected with the output end through a connecting rod 240, and two ends of the connecting rod are hinged with the ultrasonic welding head and the output end respectively. The first driving members 220 may be in one-to-one correspondence with the ultrasonic welding heads 210, or all ultrasonic welding heads 210 may be driven to move synchronously by one group of first driving members 220.

In some possible embodiments, the bed mesh combination device comprises an eighth driving member, and the eighth driving member is configured for driving the welding head assembly 200 to move along the third direction, so that the welding head assembly 200 can avoid the feeding assembly 100. With reference to FIG. 4, in some possible embodiments, the bed mesh combination device further comprises a fifth track 610 and a fifth mounting seat 620, the fifth track 610 extends along the third direction, the fifth mounting seat 620 is mounted on the fifth track 610, the eighth driving member is capable of driving the fifth mounting seat 620 to move along the fifth track 610, and the welding head assembly 200 is mounted on the fifth mounting seat 620. The welding head assembly 200 avoids the feeding assembly 100 in the third direction by moving along the fifth track 610. With continuous reference to the embodiment of FIG. 4, a first track 520 is mounted on the fifth mounting seat 620, so that the welding head assembly 200 is indirectly mounted on the fifth mounting seat 620. The welding head assembly 200 slides along the first track 520, so as to move relative to the fifth mounting seat 620.

It can be understood that a region where the welding head assembly 200 is located when avoiding the feeding assembly 100 may be defined as an avoidance region, and the avoidance region is staggered from the feeding assembly 100 in the third direction. A region where the welding head assembly 200 is located in welding may be defined as a working region, and the working region interferes with a moving region of the feeding assembly 100 in the third direction. The welding head assembly 200 is not limited to avoiding the feeding assembly 100 by moving. In other possible embodiments, the welding head assembly 200 may also realize the avoidance by rotating. Both movement and rotation can realize displacement of the welding head assembly 200 in the third direction, thus achieving an avoidance effect. For example, the bed mesh combination device may be provided with rotating shafts corresponding to a number of the welding head assemblies 200, and the welding head assemblies 200 are mounted on the rotating shafts, and the welding head assemblies 200 are driven to rotate in the third direction through rotation of the rotating shafts, so as to avoid the feeding assembly 100.

In some possible embodiments, the bed mesh combination device comprises a fifth driving member, and the fifth driving member is configured for driving the welding head assembly 200 to move along the first direction, so that the ultrasonic welding head 210 can complete welding at different positions. In this way, the total number of the welding head assemblies 200 can be reduced, thus reducing the cost. With reference to FIG. 5, in some possible embodiments, numbers of the welding cutters 310 of the two groups of welding cutter assemblies 300 are inconsistent, and the number of the welding head assemblies 200 correspond to one group of welding cutters 310 larger in number. On one hand, the welding head assemblies 200 can correspond to different groups of welding cutter assemblies 300 by position switching, and on the other hand, the welding head assemblies can cooperate with the welding cutter assemblies 300 to complete welding of one row of spring string 900 at one time, giving consideration to cost and efficiency. In addition, the position switching of the welding head assembly 200 may be performed in parallel with the laying of the spring string 900 by the feeding assembly 100, thus further reducing the influence on the production efficiency.

Certainly, when the bed mesh is too large in size and the number of the welding cutters 310 in one group of welding cutter assembly 300 is too large, the cost on completing the welding of one row of spring string 900 at one time may be too high. In this case, the number of the welding head assemblies 200 can be reduced, and the welding of one row of spring string 900 may be completed by several times.

In order to improve the application range of the bed mesh combination device, in some possible embodiments, an interval between the ultrasonic welding heads 210 is adjustable, so that positions of the ultrasonic welding heads 210 can be adjusted according to a specification of the spring string 900. For example, the bed mesh combination device comprises the first track 520, the first track 520 extends along the first direction, and the welding head assembly 200 is mounted on the first track 520, so that the position of the ultrasonic welding head 210 can be adjusted in the first direction.

Specifically, with reference to the embodiment of FIG. 1, the welding head assembly 200 comprises a first mounting seat 230, the ultrasonic welding head 210 and the first driving member 220 are mounted on the first mounting seat 230, and the first mounting seat 230 is mounted on the first track 520. It can be understood that the first track 520 may also play a guiding role when the welding head assembly 200 moves along the first direction. For example, in some possible embodiments, the feeding assembly 100 is also mounted on the first track 520, and when the parallel-type bed mesh combination device is operated, the seventh driving member drives the feeding assembly 100 and the welding head assembly 200 to move synchronously along the first track 520.

Alternatively, with reference to the embodiment of FIG. 4, the welding head assembly 200 may comprise the first mounting seat 230, and the first mounting seats 230 and the first driving members 220 are in one-to-one correspondence with the ultrasonic welding heads 210. A plurality of first mounting seats 230 are mounted on the first track 520 at intervals, the ultrasonic welding heads 210 and the first driving members 220 are mounted on corresponding first mounting seats 230, and the first driving members 220 are respectively configured for driving the corresponding ultrasonic welding heads 210 to reciprocate relative to the welding cutters 310.

Alternatively, in some other embodiments, a plurality of ultrasonic welding heads 210 are mounted on the first mounting seats 230 at intervals along the first direction, and a mounting position of the ultrasonic welding head 210 on the first mounting seat 230 may be adjusted in the first direction, so that the interval between the ultrasonic welding heads 210 is adjustable. The first driving member 220 is configured for driving the plurality of ultrasonic welding heads 210 to reciprocate relative to the welding cutters 310.

The feeding assembly 100 is described below. In some possible embodiments, the feeding assembly 100 comprises conveying members 110, the conveying members 110 are arranged at intervals in the first direction or the third direction in pairs, and a conveying channel is formed between the paired conveying members 110. The feeding channel can limit a conveying route of the spring string 900, thus preventing the spring string 900 from interfering with other structures of the bed mesh combination device.

In some possible embodiments, at least one conveying member 110 is an active member 110', and a fourth driving member is configured for driving the active member 110' to convey the spring string 900. Specifically, the active member may comprise at least one of a ratchet, a roller or a conveyor belt, and the fourth driving member is in transmission connection with the active member for driving the active member to run. For example, with reference to FIG. 2 and FIG. 5, the conveying members 110 on two sides are both the active member, the active member is the ratchet, a groove corresponding to a shape of the bagged spring is formed between teeth of the ratchet, and the groove continuously pushes the spring string 900 with rotation of the ratchet, thus sending out the spring string 900. As shown in the embodiment of FIG. 5, the feeding assembly 100 may comprise a plurality of ratchets, and the plurality of ratchets may rotate synchronously through belt transmission, chain transmission or other transmission modes.

In some possible embodiments, the feeding assembly 100 may further comprise a limiting member 120, and the limiting member 120 is configured for forming the feeding channel. For example, with reference to FIG. 1 and FIG. 4, the limiting member 120 is a baffle, the baffle extends along the second direction, the ratchet is located behind the baffle, and the ratchet and the baffle jointly form the feeding channel.

It can be understood that the feeding assembly 100 does not necessarily comprise the limiting member 120. For example, when the paired conveying members 110 are both the active member, and when the active member is the conveyor belt, the conveyor belt may also play the same limiting role as the limiting member 120 while realizing a conveying function. When the conveyor belt is used as the conveying member 110, in order to increase a contact area between the conveyor belt and the spring string 900, the paired conveying members 110 may be arranged at an interval in the third direction.

In addition, the feeding assembly 100 may be driven to move in the first direction by a sixth driving member. In some possible embodiments, the bed mesh combination device comprises a sixth track, the sixth track extends along the first direction, the feeding assembly 100 is mounted on the sixth track, and the sixth driving member drives the feeding assembly 100 to move along the sixth track.

A receiving module is described below. It can be understood that, in the disclosure, after the laying of one row of spring string 900 is completed, one group of welding cutters 310 may move to one side of the spring string 900 facing towards the feeding assembly 100, and the spring string 900 is pushed to the welding station, so as to allow the feeding assembly 100 to lay a new row of spring string 900. At the welding station, the welding positions of the spring string 900 may correspond to another group of welding cutters 310. The welding cutters 310 corresponding to the welding positions of the spring string 900 refers to that the welding cutters 310 are close enough to the welding positions of the spring string 900, so as to allow the ultrasonic welding heads 210 and the welding cutters 310 to clamp the welding positions of the spring string 900 for ultrasonic welding.

For example, after a first row of spring string 900 is laid, the second welding cutters 312 may move from the welding station to one side of the first row of spring string 900 far away from the first welding cutters 311, and the first row of spring string 900 is pressed towards the welding station, so that the first welding positions 910 correspond to the first welding cutters 311. Then, a second row of spring string 900 is laid, and the ultrasonic welding heads 210 and the first welding cutters 311 clamp the first welding positions 910 of the first row of spring string 900 and the second row of spring string 900, and weld the first welding positions 910 of the two rows of spring strings 900 together. After welding, the first welding cutters 311 may move from the welding station to one side of the second row of spring string 900 far away from the second welding cutter 312, and the second row of spring string 900 is pressed towards the welding station, so that the second welding positions 920 correspond to the second welding cutters 312. Then, a third row of spring string 900 is laid, and the ultrasonic welding heads 210 and the second welding cutters 312 clamp the second welding positions 920 of the second row of spring string 900 and the third row of spring string 900, and weld the second welding positions 920 of the two rows of spring strings 900 together. The first welding cutter 311 and the second welding cutter 312 move alternately, thus realizing a cycle of welding.

In order to realize the movement of the welding cutter 310, in some possible embodiments, the bed mesh combination device comprises a second driving member 550 and a third driving member, the second driving member 550 is configured for driving the welding cutter 310 to move along the second direction, and the third driving member is configured for driving the welding cutter 310 to move along the third direction. For example, the third driving member draws out the first welding cutter 311 from the bed mesh first; then the second driving member 550 makes the first welding cutter 311 reach one side of the even-numbered row of spring string 900 just laid far away from the second welding cutter 312, and the third driving member makes the first welding cutter 311 reset; and finally, the second driving member 550 makes the first welding cutter 311 press the even-numbered row of spring string 900 towards the second welding cutter 312, thus completing one movement process of the first welding cutter 311.

With reference to FIG. 1, in some possible embodiments, the bed mesh combination device further comprises a rack 510, a third track 570, a third mounting seat 560 and a second mounting seat 540. The third track 570 and the third driving member (not shown in the figure) are mounted on the rack 510, the third track 570 extends along the third direction, the third mounting seat 560 is mounted on the third track 570, and the third driving member can drive the third mounting seat 560 to move in the third direction. The second driving member 550 is mounted on the third mounting seat 560, the second driving member 550 is the air cylinder, the second mounting seat 540 is mounted at an output end of the second driving member 550, and the second driving member 550 can drive the second mounting seat 540 to move in the second direction.

Figure 3:
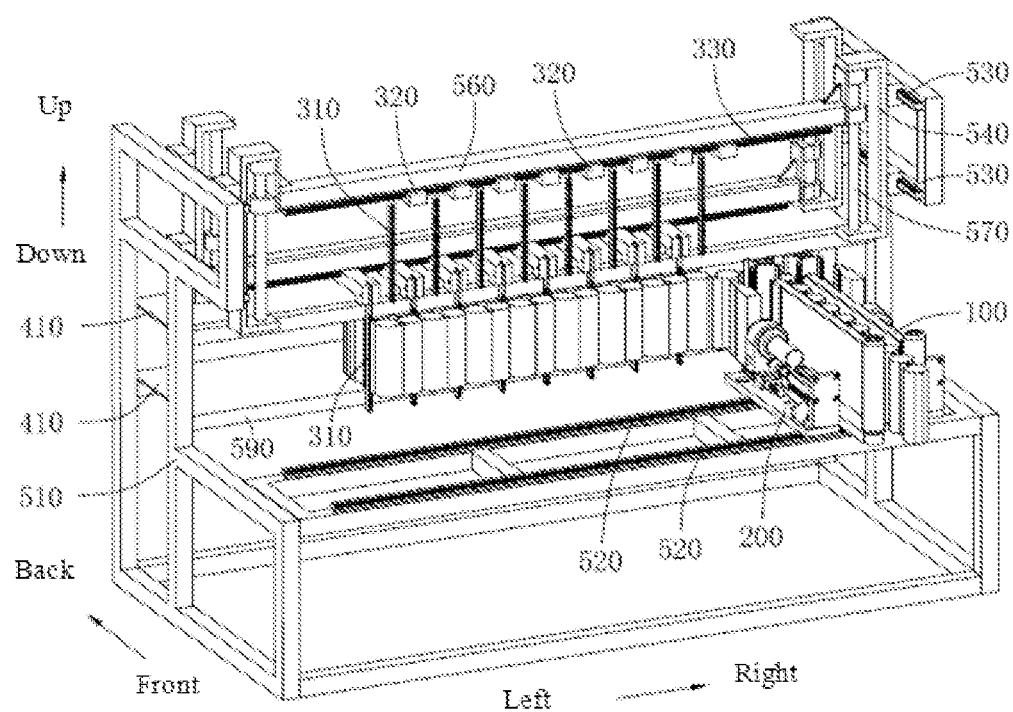
FIG. 3 is a schematic structural diagram of a bed mesh combination device according to another embodiment of the disclosure.

FIG. 3 shows other embodiments of the second driving member 550 and the third driving member. In the embodiment of FIG. 3, the first direction is a left-right direction, the second direction is a front-back direction, and the third direction is an up-down direction. The parallel-type bed mesh combination device further comprises a second track 530, the second track 530 extends along the second direction, the second track 530 and the second driving member (not shown in the figure) are mounted on the rack 510, the second mounting seat 540 is mounted on the second track 530, and the second driving member can drive the second mounting seat 540 to move in the second direction. The third track 570 is mounted on the second mounting seat 540, the third mounting seat 560 is mounted on the third track 570, and the welding cutter assembly 300 is mounted on the third mounting seat 560.

FIG. 4 shows other embodiments of the second driving member 550 and the third driving member. In the embodiment of FIG. 4, the bed mesh combination device further comprises the rack 510, the second track 530, the second mounting seat 540, the third track 570 and the third mounting seat 560. The second track 530 and the second driving member 550 (not shown in the figure) are mounted on the rack 510, the second track 530 extends along the second direction, the second mounting seat 540 is mounted on the second track 530, the second driving member 550 is configured for driving the second mounting seat 540 to move along the second track 530, the third track 570 extends along the third direction, the third track 570 is mounted on the second mounting seat 540, the third mounting seat 560 is mounted on the third track 570, the third driving member (not shown in the figure) is configured for driving the third mounting seat 560 to move along the third track 570, and the welding cutter assembly 300 is mounted on the third mounting seat 560. It can be understood that two groups of second driving members 550 and third driving members are provided in this case, thus corresponding to the two groups of welding cutter assemblies 300 respectively.

In other possible embodiments, the second track 530 may also be set to extend along the third direction and the third track 570 may also be set to extend along the second direction, or the second track 530 and/or the third track 570 may not be used. For example, in some possible embodiments, the second track 530 extends along the third direction, the bed mesh combination device does not comprise the third track 570, the second driving member 550 uses a linear air cylinder, a linear motor or a similar device, the third mounting seat 560 is mounted at an output end of the second driving member 550, and the second driving member 550 drives the third mounting seat 560 to move in the second direction.

In the above embodiment, two groups of second driving members 550 and third driving members are provided, thus corresponding to the two groups of welding cutter assemblies 300 respectively.

It can be understood that, besides a linear movement way, the second driving member 550 and the third driving member may also drive the welding cutter 310 in other ways. In other possible embodiments, the second driving member 550 can drive the welding cutter assembly 300 to extend or retract, and the third driving members can respectively drive the two groups of welding cutters to rotate through a clutch or a similar switching device. In such embodiment, taking the first welding cutter 311 as an example, the second driving member 550 makes the first welding cutter 311 retract first, and the first welding cutter 311 is drawn out from the spring string 900; then the third driving member drives the first welding cutter 311 to rotate, and during rotation, the second driving member 550 makes the first welding cutter 311 extend and reset; and at the end of rotation, the extended first welding cutter 311 pushes the spring string 900 away from the feeding assembly 100.

In some possible embodiments, an interval between the welding cutters 310 is adjustable. The interval between the welding cutters 310 is adjusted to enable the welding cutters 310 to accurately correspond to the welding positions between two bagged springs in the first direction. Specifically, a distance between two adjacent welding cutters 310 in the same group of welding cutter assembly 300 is equal to a sum of the diameters of two individual bagged springs, which is namely a distance between the first welding positions 910 or a distance between the two second welding positions 920. For example, with reference to the embodiment of FIG. 4, the welding cutter assembly comprises a fourth track 330 and a fourth mounting seat 320, the fourth track 330 extends along the first direction, the fourth mounting seat 320 is mounted on the fourth track 330, and the welding cutter 310 is mounted on the fourth mounting seat 320. A position of the fourth mounting seat 320 is adjusted along the fourth track 330 first, and after the position is adjusted, the fourth mounting seat 320 is locked by a fastener such as a screw.

The fourth track 330 may be mounted on the second mounting seat 540 or the third mounting seat 560.

Figure 8:
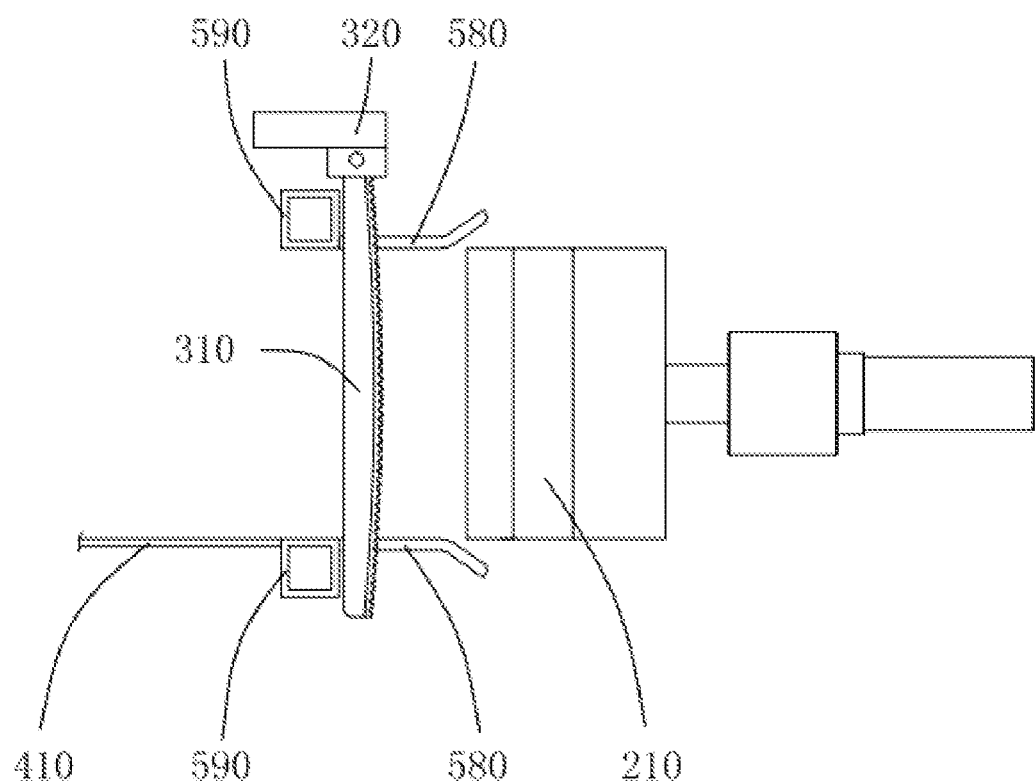
FIG. 8 is a top view of a part of the bed mesh combination device according to the embodiment in FIG. 4, wherein a positional relationship between a welding head assembly, a discharging assembly and a supporting member is shown.

In some possible embodiments, with reference to FIG. 8, the bed mesh combination device comprises a supporting member 590, the supporting member 590 is located on an opposite side of a welding surface of the welding cutter 310, and the supporting member 590 is configured for supporting one end of the welding cutter 310 far away from the fourth mounting seat 320. The supporting member 590 and the fourth mounting seat 320 are respectively used as supporting points at two ends of the welding cutter 310, so that deformation of the welding cutter 310 when the ultrasonic welding head 210 is pressed against the welding cutter 310 for welding can be reduced. With reference to FIG. 1 and FIG. 3, in some possible embodiments, the supporting member 590 extends along the first direction, and the plurality of welding cutters 310 share one supporting member 590.

With continuous reference to FIG. 8, in some possible embodiments, a convex surface oriented to the ultrasonic welding head 210 is formed on the welding cutter 310, and the convex surface is configured for better fitting the welding cutter 310 deformed by a force with the ultrasonic welding head 210. Specifically, when the ultrasonic welding head 210 is pressed against the convex surface, the welding cutter 310 is deformed by a pressure, so that the convex surface is restored to a plane to better fit with the ultrasonic welding head 210.

Figure 6:
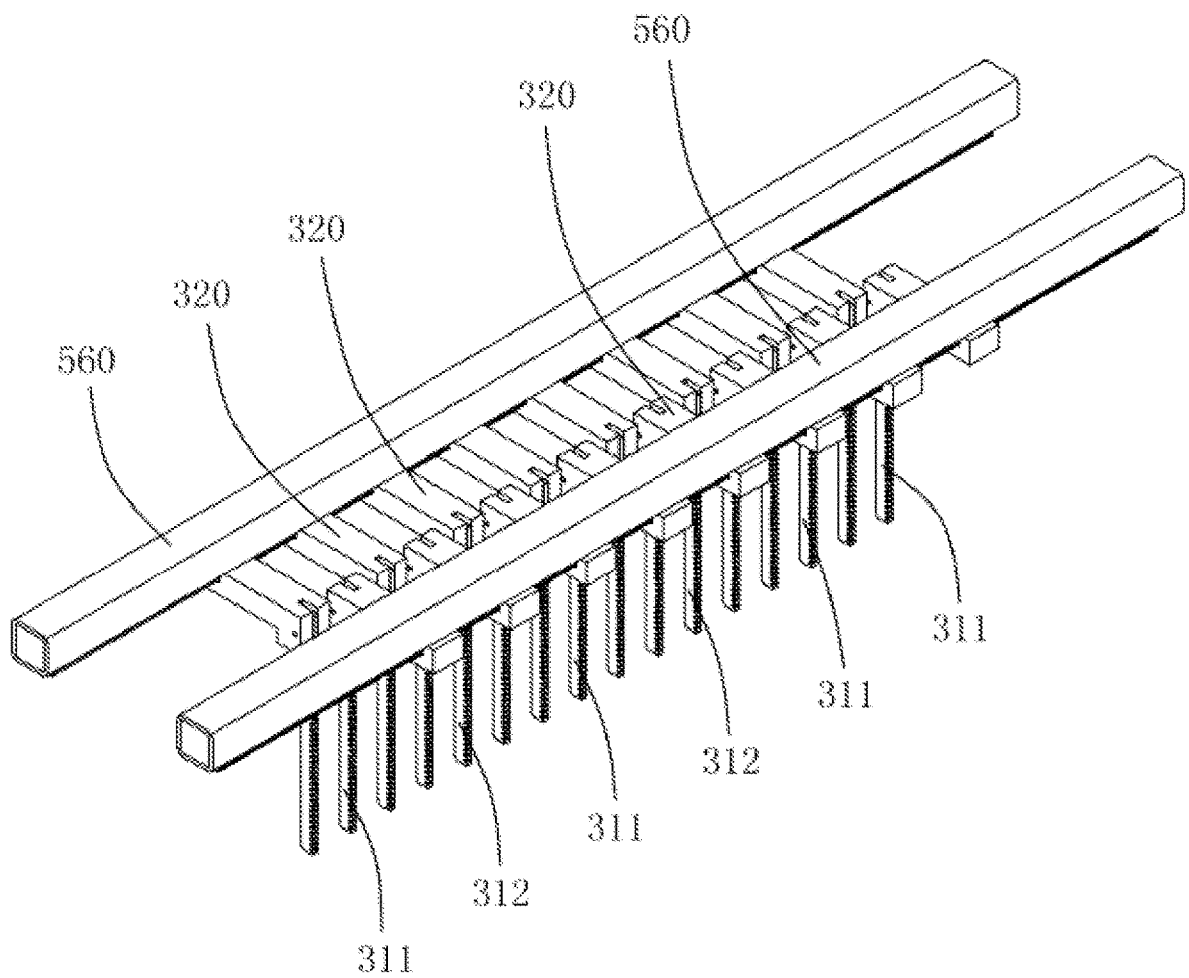
FIG. 6 is a schematic structural diagram of a part of the bed mesh combination device according to the embodiment in FIG. 4, wherein a composition of a welding cutter assembly is shown.
Figure 7:
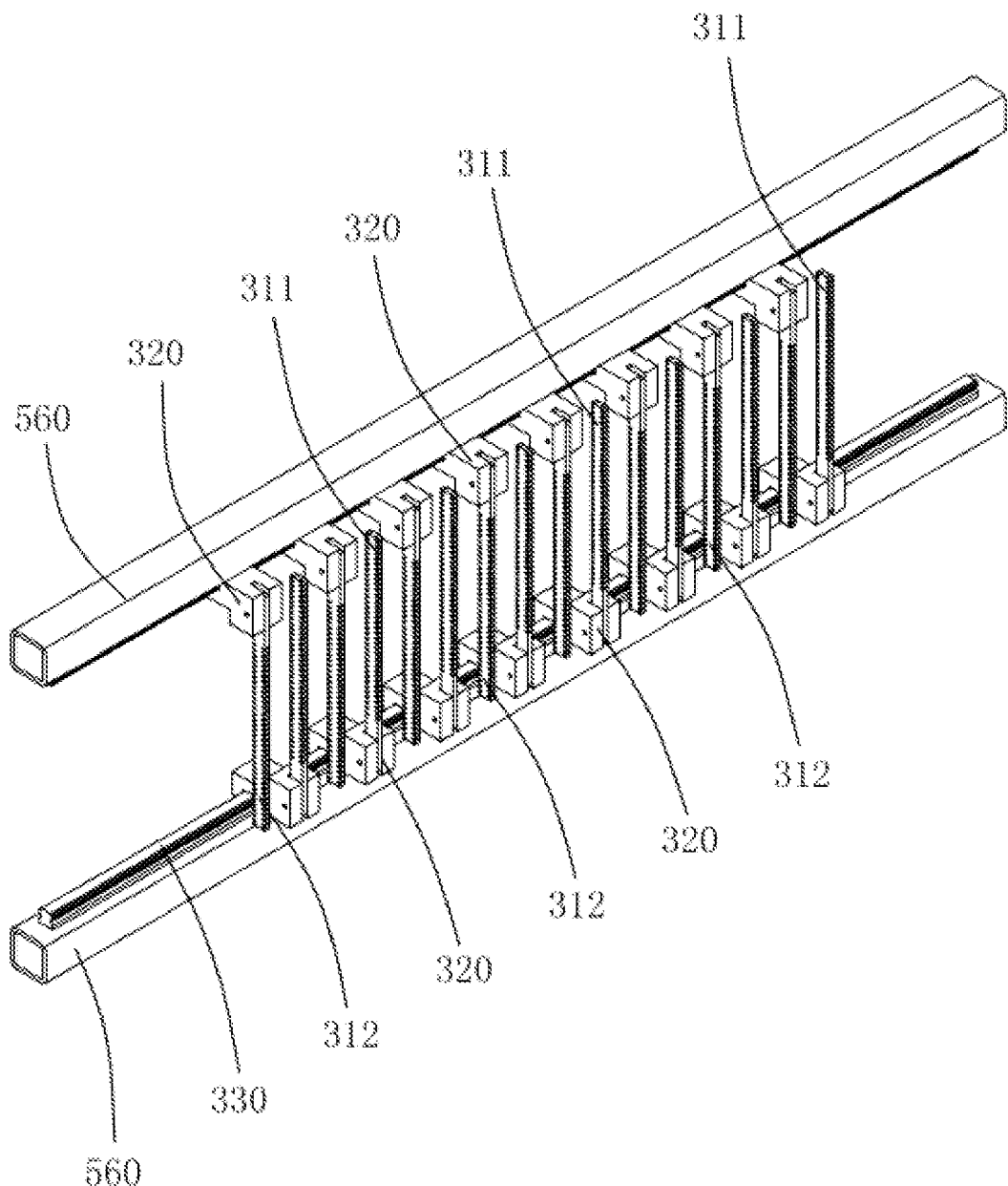
FIG. 7 is a schematic structural diagram of a part of the bed mesh combination device according to another embodiment of the disclosure, wherein another composition of the welding cutter assembly different from that in FIG. 6 is shown.

In some possible embodiments, the bed mesh combination device comprises a discharging assembly 400, and the discharging assembly 400 is configured for receiving the spring string 900 sent by the welding cutter assembly 300. In the embodiments of FIG. 3 and FIG. 4, the two groups of welding cutter assemblies 300 are located on the same side of the discharging assembly 400 in the third direction, and in the embodiment of FIG. 1, the two groups of welding cutter assemblies 300 are located on two sides of the discharging assembly 400 in the third direction. FIGS. 6 and FIG. 7 respectively show a positional relationship of the two groups of welding cutter assemblies 300 relative to the discharging assembly 400 in different embodiments. When located on the same side, the two groups of welding cutter assemblies 300 move in the same direction when drawn out from the welded spring string 900; and when located on two sides, the two groups of welding cutter assemblies 300 move in opposite directions when drawn out from the welded spring string 900.

The discharging assembly is continuously described. In some possible embodiments, the discharging assembly comprises a receiving member 410, the receiving member 410 is located on an opposite side of the welding surface of the welding cutter 310 in the second direction, and the receiving member 410 is configured for receiving the spring string 900 sent by the welding cutter assembly 300. The receiving member 410 may comprise at least one of a loading platform, a baffle or a conveyor belt.

In the embodiment of FIG. 1 or FIG. 3, the receiving member 410 is a baffle, the baffle extends in the second direction (the up-down direction), and the baffle can position the spring string 900, thus avoiding the spring string 900 from deviating from a predetermined position. In other possible embodiments, the second direction is the front-back direction, the receiving member 410 can also play a role in receiving the spring string in this case, and the receiving member 410 may comprise a conveyor belt, so as to send out the welded bed mesh.

In the embodiment of FIG. 4, the receiving member 410 is a loading platform, the welding cutter assembly 300 sends the spring string 900 above the receiving member 410, and the receiving member 410 supports the spring string 900. After the bed mesh is combined, the bed mesh is taken out from the discharging assembly manually or by other tools. In other embodiments, the receiving member 410 is a conveyor belt. After the bed mesh is combined, the conveyor belt can convey the bed mesh along the second direction, thus automatically sending out the bed mesh. In addition, two groups of receiving members 410 may be provided, and the two groups of receiving members 410 are arranged at an interval in the third direction, thus forming a discharging channel.

The supporting member 590 may be mounted on the receiving member 410. It can be understood that the above-mentioned "mounting" may not only refer to that the supporting member 590 is detachably mounted on the receiving 410, but also refer to that the supporting member 590 is integrated with the receiving member 410.

In some possible embodiments, the bed mesh combination device comprises a guiding member 580, the guiding member 580 is arranged on the welding cutter assembly 300 or the discharging assembly 400, the guiding member 580 comprises a guiding inclined plane, the guiding inclined plane is inclined to an end surface of the bagged spring in the spring string 900, and the guiding member 580 is configured for arranging and aligning the spring string 900 in the first direction and guiding the spring string 900 to move in the second direction.

In some possible embodiments, the discharging assembly 400 comprises two groups of receiving members 410, the two groups of receiving members 410 are arranged at an interval in the third direction, and a receiving channel is formed between the two groups of receiving members 410. The welding cutter 310 can press the laid spring string 900 towards the receiving channel, so that the bed mesh is sent out through the receiving channel. Accordingly, in some possible embodiments, the bed mesh combination device comprises two groups of guiding members 580, the two groups of guiding members 580 are arranged oppositely in the third direction, the two groups of guiding members 580 form a guiding channel with a gradually reduced cross-sectional area, and the guiding member 580 is configured for guiding the spring string 900 to enter the receiving channel.

With reference to the embodiments of FIG. 1, FIG. 4 and FIG. 8, the guiding member 580 may be mounted on the fourth mounting seat 320, and in other embodiments, the guiding member 580 may also be mounted on the receiving member 410.

An embodiment of the disclosure provides a bed mesh combination method, the bed mesh combination method is suitable for the bed mesh combination device of the "parallel-type" design, and in the bed mesh combination method, the spring strings 900 are combined into an adhesive-free bed mesh through the bed mesh combination device. The bed mesh combination method comprises the following steps of:

step 100: making the feeding assembly 100 move along the first direction, and laying a first row of spring string 900 on a first group of welding cutters 310;

step 200: making a second group of welding cutters 310 move to one side of an odd-numbered row of spring string 900 facing towards the feeding assembly 100 and then move along the second direction, and driving the odd-numbered row of spring string 900 to reach a welding station;

step 300: making the feeding assembly 100 move along the first direction, laying an even-numbered row of spring string 900 on the odd-numbered row of spring string 900, in the process, sequentially pressing the ultrasonic welding heads 210 towards the first group of welding cutters 310, and welding first welding positions 910 of the even-numbered row of spring string 900 and the odd-numbered row of spring string 900 by the ultrasonic welding heads 210 and the first group of welding cutters 310;

step 400: drawing out the first group of welding cutters 310 from the spring strings 900;

step 500: making the first group of welding cutters 310 move to one side of the even-numbered row of spring string 900 facing towards the feeding assembly 100 and then move along the second direction, and driving the even-numbered row of spring string 900 to reach the welding station;

step 600: making the feeding assembly 100 move along the first direction, laying the odd-numbered row of spring string 900 on the even-numbered row of spring string 900, in the process, sequentially pressing the ultrasonic welding heads 210 towards the second group of welding cutters 310, and welding second welding positions of the odd-numbered row of spring string 900 and the even-numbered row of spring string 900 by the ultrasonic welding heads 210 and the second group of welding cutters 310;

step 700: drawing out the second group of welding cutters from the spring strings; and repeating the step 200 to the step 700, until the spring strings 900 are welded into the bed mesh with a predetermined size.

FIG. 9 to FIG. 15 show an action process of the bed mesh combination device when executing the bed mesh combination method based on the embodiment of the bed mesh combination device of FIG. 1. It can be understood that FIG. 9 to FIG. 15 respectively show only a certain moment in the action process of the bed mesh combination device, and cannot fully show all actions of the bed mesh combination device in one step.

Figure 9:
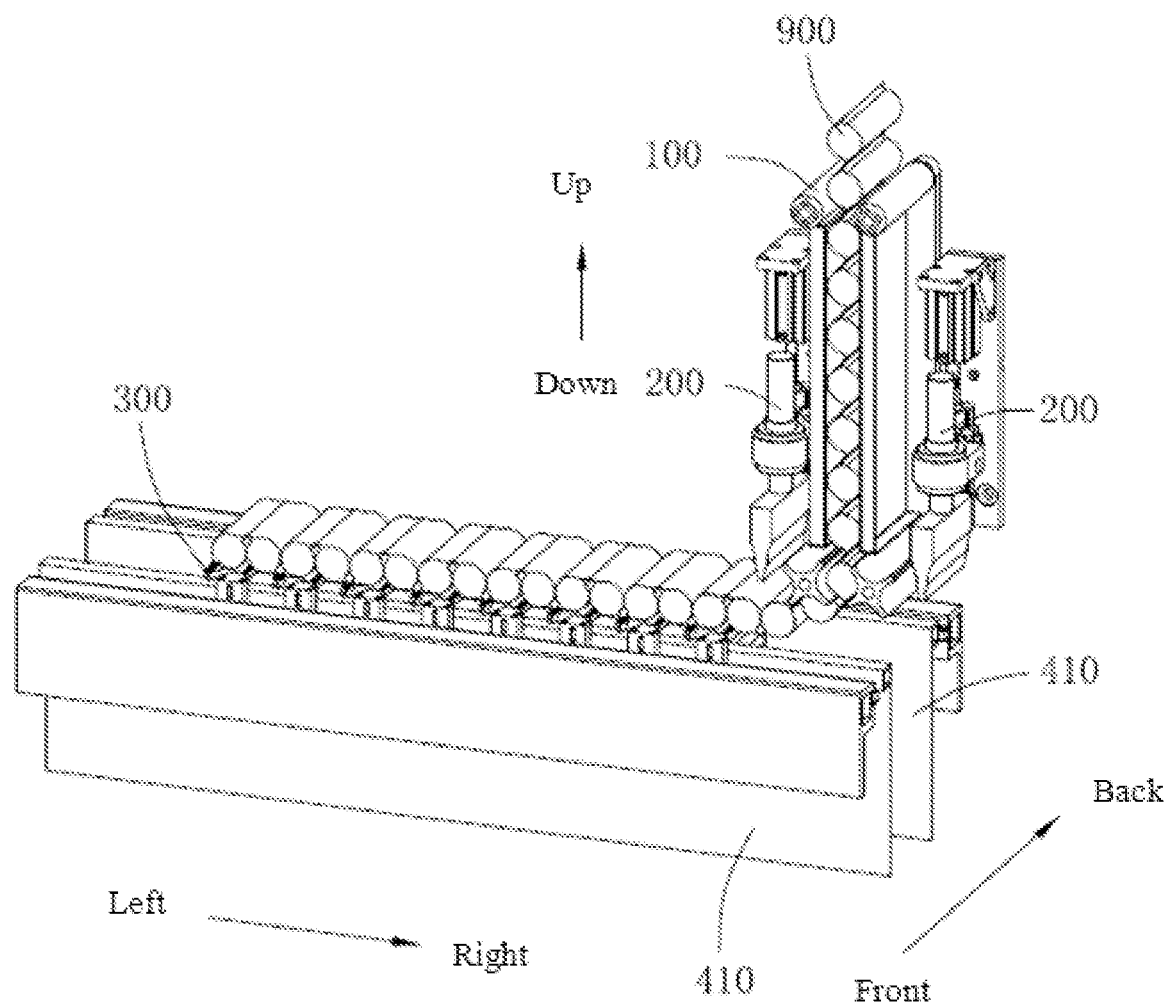
FIG. 9 is a schematic diagram of a movement of the bed mesh combination device according to the embodiment in FIG. 1 when executing the bed mesh combination method, wherein a feeding assembly completes laying of an odd-numbered row of spring string.
Figure 10:
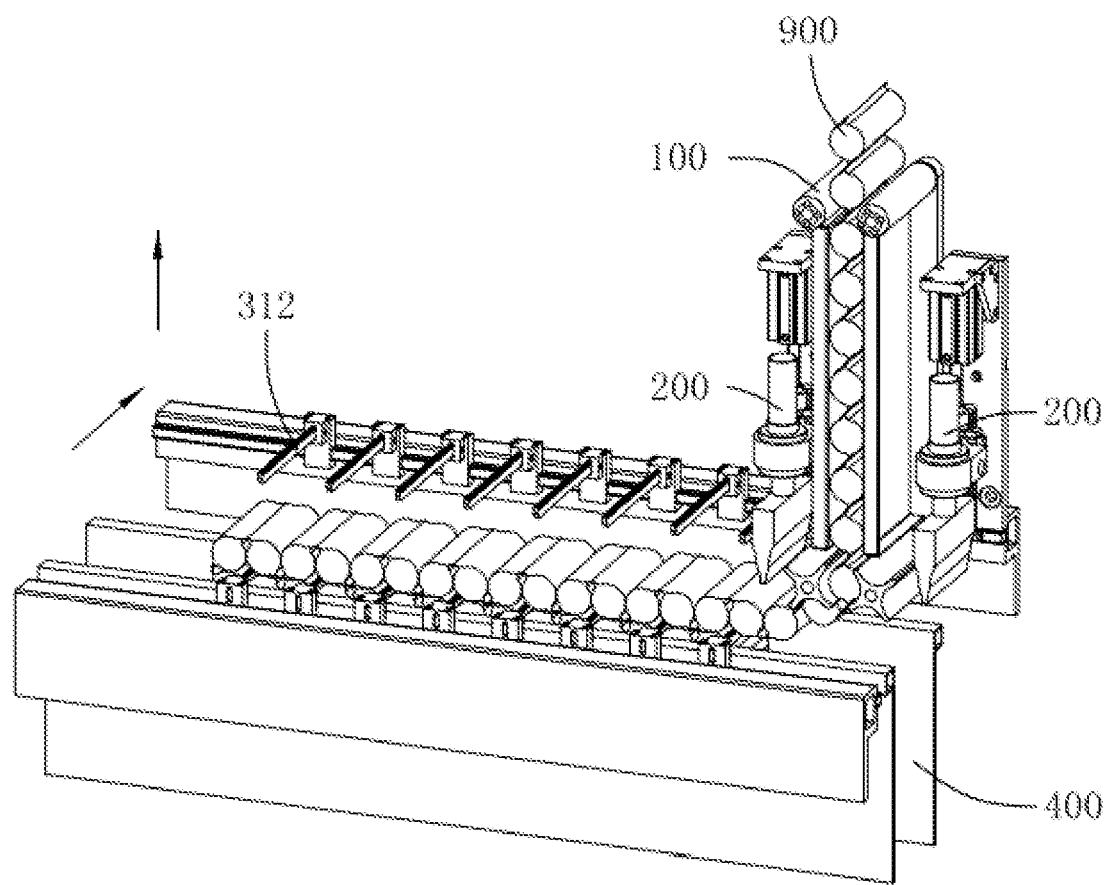
FIG. 10 is a schematic diagram of the movement of the bed mesh combination device according to the embodiment in FIG. 1 when executing the bed mesh combination method, wherein the bed mesh combination device executes step 200 and step 700 of the bed mesh combination method.
Figure 11:
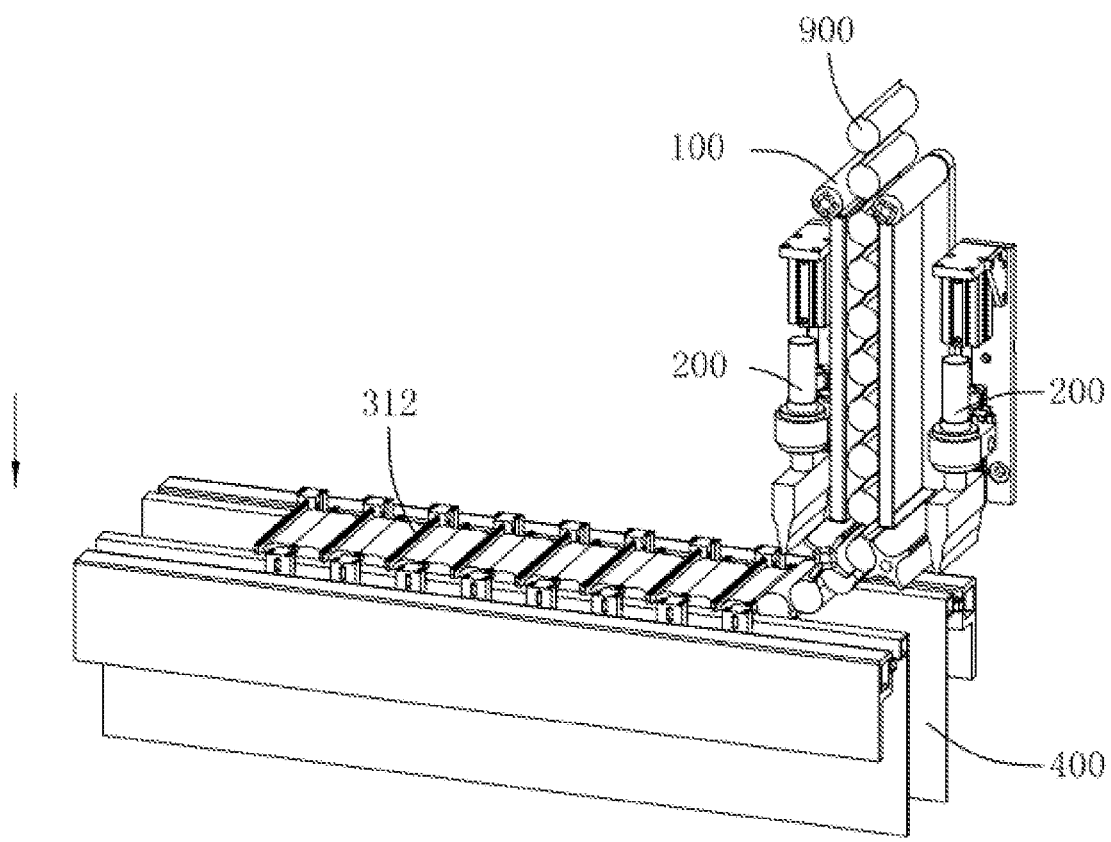
FIG. 11 is a schematic diagram of the movement of the bed mesh combination device according to the embodiment in FIG. 1 when executing the bed mesh combination method, wherein the bed mesh combination device executes step 200 of the bed mesh combination method.
Figure 12:
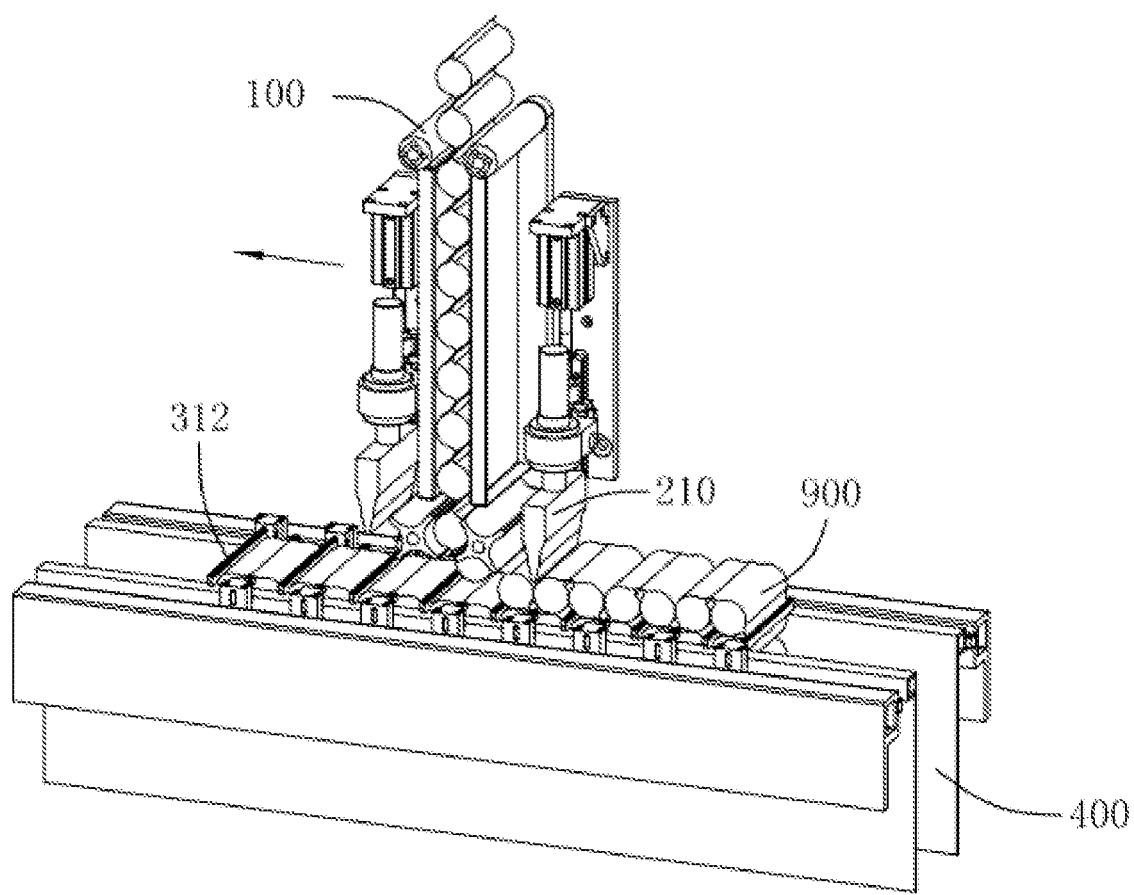
FIG. 12 is a schematic diagram of the movement of the bed mesh combination device according to the embodiment in FIG. 1 when executing the bed mesh combination method, wherein the bed mesh combination device executes step 300 of the bed mesh combination method.
Figure 13:
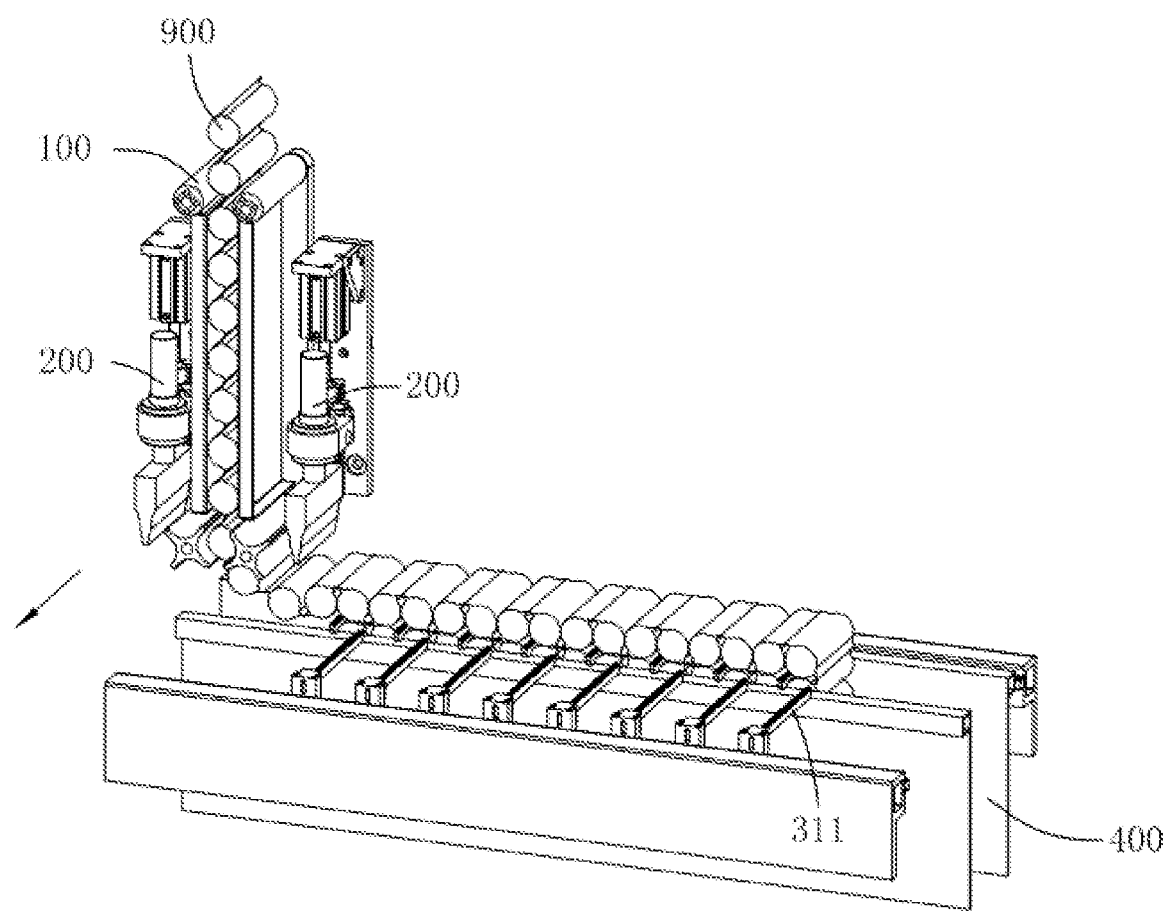
FIG. 13 is a schematic diagram of the movement of the bed mesh combination device according to the embodiment in FIG. 1 when executing the bed mesh combination method, wherein the bed mesh combination device executes step 400 of the bed mesh combination method.
Figure 14:
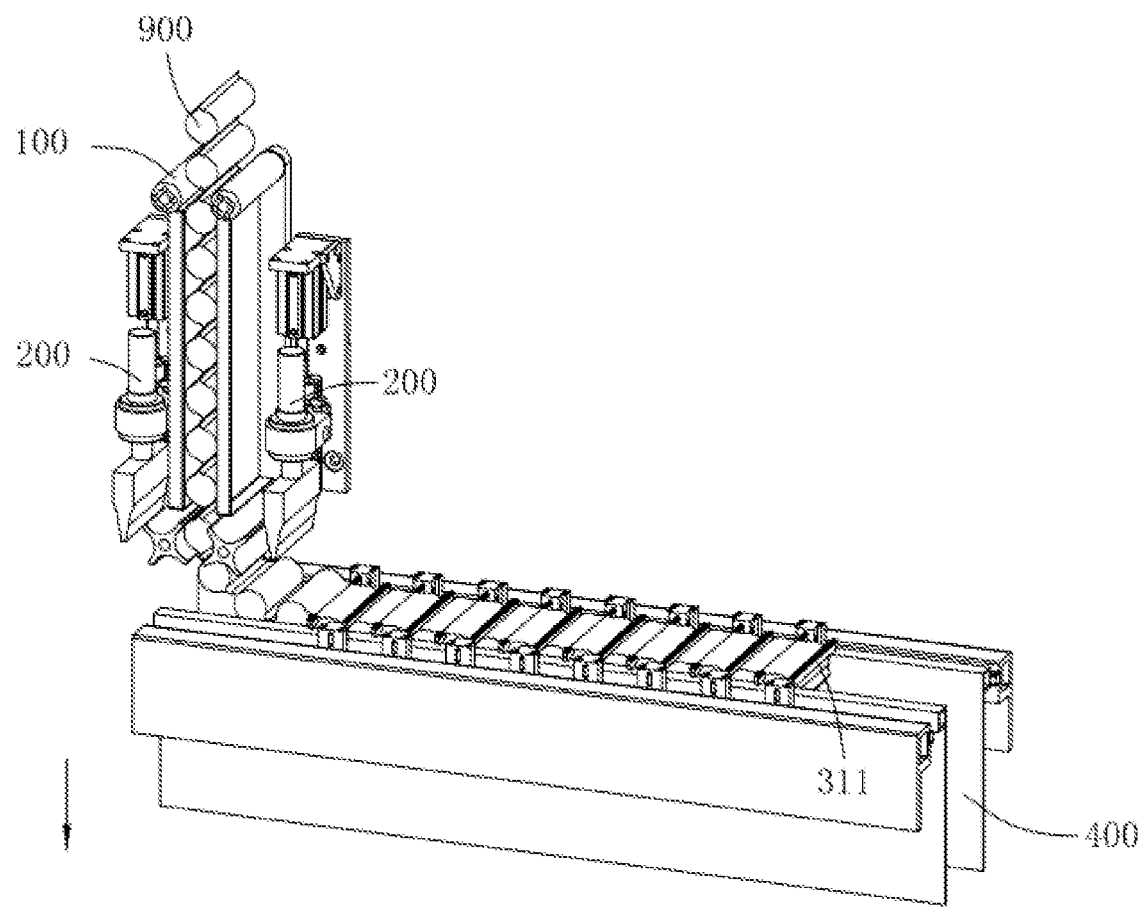
FIG. 14 is a schematic diagram of the movement of the bed mesh combination device according to the embodiment in FIG. 1 when executing the bed mesh combination method, wherein the bed mesh combination device executes step 500 of the bed mesh combination method.
Figure 15:
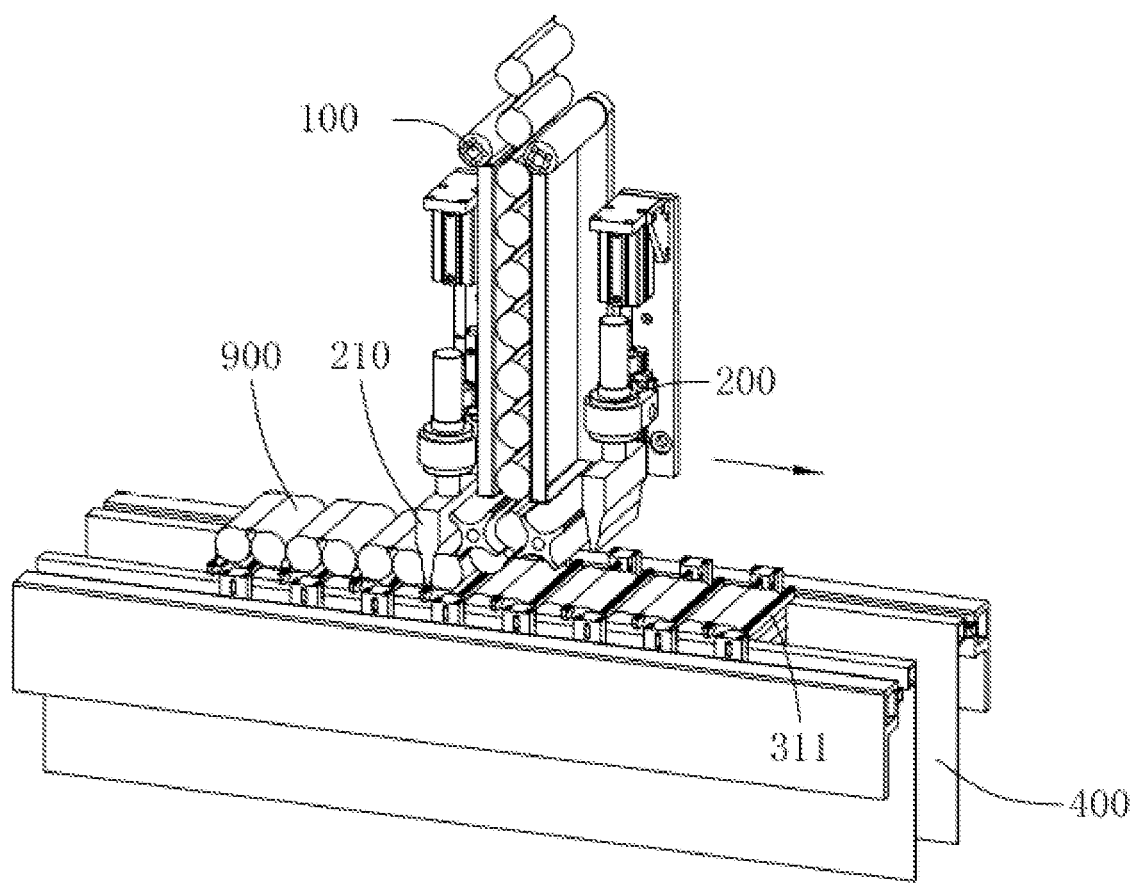
FIG. 15 is a schematic diagram of the movement of the bed mesh combination device according to the embodiment in FIG. 1 when executing the bed mesh combination method, wherein the bed mesh combination device executes step 600 of the bed mesh combination method.

Sequentially referring to FIG. 9 to FIG. 15: firstly referring to FIG. 9, the bed mesh combination device is in a state of completing the laying of the odd-numbered row of spring string 900;

then referring to FIG. 10, the second welding cutters 312 (which are namely the second group of welding cutters 310) move backward in the third direction to be drawn out from the spring string 900 first under driving of the third driving member, then the second welding cutters 312 ascend in the second direction to be above the odd-numbered row of spring string 900 under driving of the second driving member 550, and then the second welding cutters 312 reset in the third direction;

then referring to FIG. 11, the second welding cutters 312 descend in the second direction, and the odd-numbered row of spring string 900 is pressed towards the first welding cutters 311 (which are namely the first group of welding cutters 310), so that positions of the first welding cutters 311 correspond to the first welding positions 910 on one hand, and the odd-numbered row of spring string 900 enters the receiving channel on the other hand;

then referring to FIG. 12, the feeding assembly 100 and the welding head assembly 200 move to the left along the first direction under driving of the seventh driving member, the feeding assembly 100 sends out the even-numbered row of spring string 900 by rotation of the conveying member 110 while moving; when the welding head assembly 200 on a right side of the feeding assembly 100 reaches above the welding position, the feeding assembly 100 and the welding head assembly 200 stop moving in the first direction, the ultrasonic welding head 210 on the right side of the feeding assembly 100 is pressed towards the first welding cutter 311 under driving of the first driving member 220, and the even-numbered row of spring string 900 is welded on the odd-numbered row of spring string 900;

then referring to FIG. 13, the first welding cutters 311 move forward in the third direction first to be drawn out from the spring string 900, then ascend to be above the even-numbered row of spring string 900 in the second direction, and reset in the third direction;

then referring to FIG. 14, the first welding cutters 311 descend in the second direction, and the even-numbered row of spring string 900 is pressed towards the second welding cutters 312, so that positions of the second welding cutters 312 correspond to the second welding positions 920 on one hand, and the even-numbered row of spring string 900 enters the receiving channel on the other hand; and then referring to FIG. 15, the feeding assembly 100 and the welding head assembly 200 move to the right along the first direction, the feeding assembly 100 sends out the odd-numbered row of spring string 900 while moving; when the welding head assembly 200 on a left side of the feeding assembly 100 reaches above the welding position, the feeding assembly 100 and the welding head assembly 200 stop moving in the first direction, the ultrasonic welding head 210 on the left side of the feeding assembly 100 is pressed towards the second welding cutter 312, and the even-numbered row of spring string 900 is welded on the odd-numbered row of spring string 900.

In some possible embodiments, before the step 100, the bed mesh combination method further comprises step 10: adjusting the first group of welding cutters 310, so that the first group of welding cutters 310 correspond to the first welding positions 910 of the spring string 900 in the first direction; and adjusting the second group of welding cutters 310, so that the second group of welding cutters 310 correspond to the second welding positions 920 of the spring string 900 in the first direction, and in subsequent welding steps, positions of the welding cutters 310 in the first direction remain unchanged.

It can be understood that, after executing the step 10, a distance between two adjacent first welding cutters 311 is equal to a distance between two first welding positions 910, and a distance between two adjacent second welding cutters 312 is equal to a distance between two second welding positions 920.

An embodiment of the disclosure further provides another bed mesh combination method, the bed mesh combination method is suitable for the bed mesh combination device of the "non-parallel-type" design, and in the bed mesh combination method, the spring strings 900 are combined into an adhesive-free bed mesh through the bed mesh combination device. The bed mesh combination method comprises the following steps of:

step 100: making the feeding assembly 100 move along the first direction, and laying a first row of spring string 900 on a first group of welding cutters 310;

step 200: making a second group of welding cutters 310 move to one side of an odd-numbered row of spring string 900 facing towards the feeding assembly 100 and then move along the second direction, and driving the odd-numbered row of spring string 900 to reach a welding station;

step 300: making the feeding assembly 100 move along the first direction, and laying an even-numbered row of spring string 900 on the odd-numbered row of spring string 900;

step 400: making the welding head assembly 200 move to a position corresponding to the first group of welding cutters 310 in the first direction, pressing the ultrasonic welding heads 210 towards the first group of welding cutters 310 along the second direction, and welding first welding positions 910 of the even-numbered row of spring string 900 and the odd-numbered row of spring string 900 by the ultrasonic welding heads 210 and the first group of welding cutters 310;

step 500: drawing out the first group of welding cutters 310 from the spring strings 900;

step 600: making the first group of welding cutters 310 move to one side of the even-numbered row of spring string 900 facing towards the feeding assembly 100 and then move along the second direction, and driving the even-numbered row of spring string 900 to reach the welding station;

step 700: making the feeding assembly 100 move along the first direction, and laying the odd-numbered row of spring string 900 on the even-numbered row of spring string 900;

step 800: making the welding head assembly 200 move to a position corresponding to the second group of welding cutters 310, pressing the ultrasonic welding heads 210 towards the second group of welding cutters 310 along the second direction, and welding second welding positions 920 of the odd-numbered row of spring string 900 and the even-numbered row of spring string 900 by the ultrasonic welding heads 210 and the second group of welding cutters 310;

step 900: drawing out the second group of welding cutters 310 from the spring strings 900;

repeating the step 200 to the step 900, until the spring strings 900 are welded into the bed mesh with a predetermined size.

In some possible embodiments, before the step 100, the bed mesh combination method further comprises step 10:

adjusting the first group of welding cutters 310, so that the first group of welding cutters 310 correspond to the first welding positions 910 of the spring string 900 in the first direction; and adjusting the second group of welding cutters 310, so that the second group of welding cutters 310 correspond to the second welding positions 920 of the spring string 900 in the first direction, and in subsequent welding steps, positions of the welding cutters 310 in the first direction remain unchanged.

It can be understood that, after executing the step 10, a distance between two adjacent first welding cutters 311 is equal to a distance between two first welding positions 910, and a distance between two adjacent second welding cutters 312 is equal to a distance between two second welding positions 920.

In some possible embodiments, before the welding head assembly 200 moves in the first direction, the welding head assembly 200 moves to a working region along the third direction, and after completing welding, the welding head assembly 200 moves to an avoidance region along the third direction. It can be understood that the "completing welding" refers to that the ultrasonic welding heads 210 cooperate with the first group of welding cutters 310 to complete welding of all the first welding positions 910, or the ultrasonic welding heads 210 cooperate with the second group of welding cutters 310 to complete welding of all the second welding positions 920.

In some possible embodiments, when a number of the ultrasonic welding heads 210 is less than that of the first group of welding cutters 310, the step 400 is repeatedly executed to complete welding of all the first welding positions 910, and when the number of the ultrasonic welding heads 210 is less than that of the second group of welding cutters 310, the step 800 is repeatedly executed to complete welding of all the second welding positions 920.

FIG. 16 to FIG. 24 show an action process of the bed mesh combination device when executing the bed mesh combination method based on the embodiment of the bed mesh combination device of FIG. 4. It can be understood that FIG. 16 to FIG. 24 respectively show only a certain moment in the action process of the bed mesh combination device, and cannot fully show all actions of the bed mesh combination device in one step.

Figure 16:
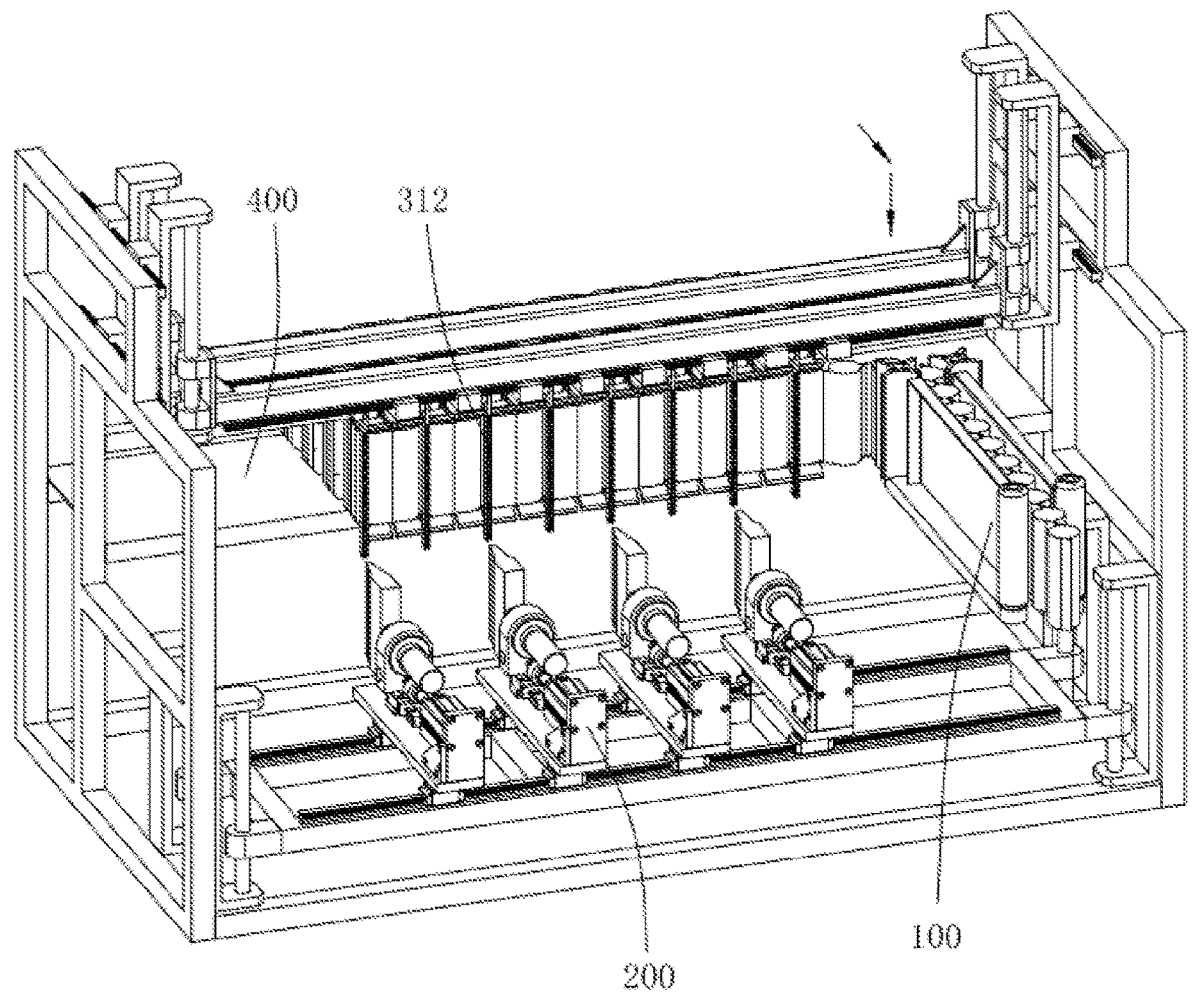
FIG. 16 is a schematic diagram of the movement of the bed mesh combination device according to the embodiment in FIG. 4 when executing the bed mesh combination method, wherein the bed mesh combination device executes step 200 of the bed mesh combination method.
Figure 17:
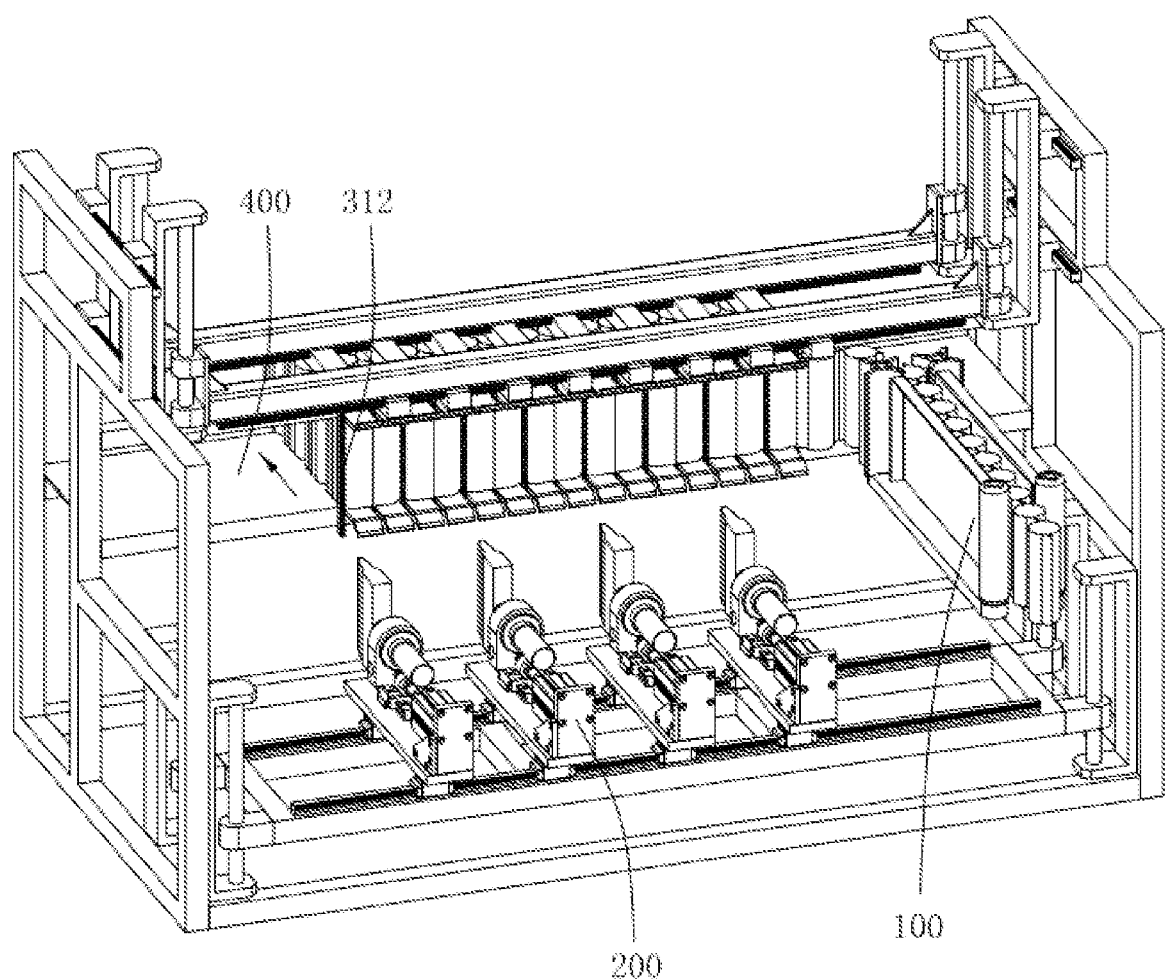
FIG. 17 is a schematic diagram of the movement of the bed mesh combination device according to the embodiment in FIG. 4 when executing the bed mesh combination method, wherein the bed mesh combination device executes step 200 of the bed mesh combination method.
Figure 18:
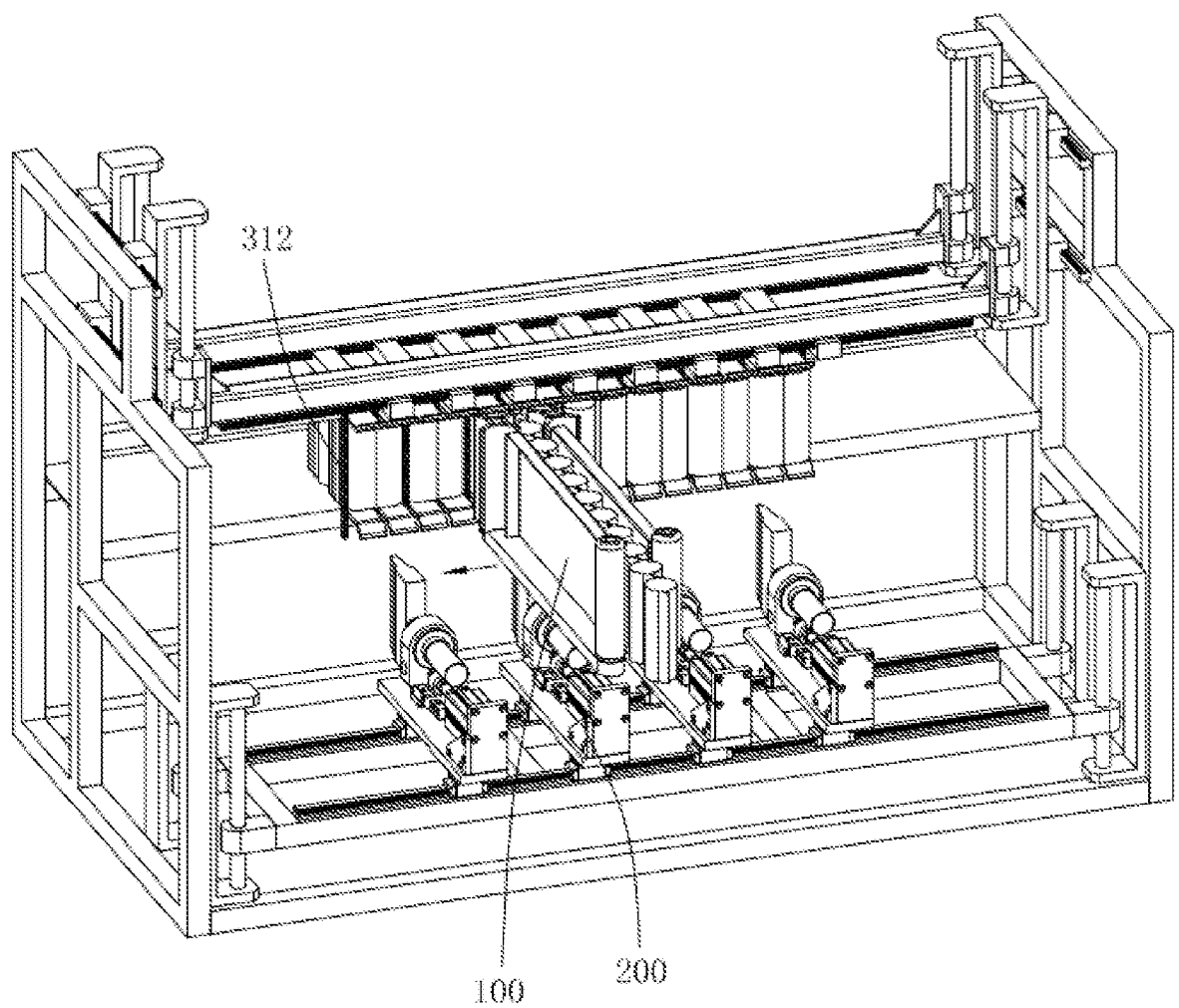
FIG. 18 is a schematic diagram of the movement of the bed mesh combination 20) device according to the embodiment in FIG. 4 when executing the bed mesh combination method, wherein the bed mesh combination device executes step 300 of the bed mesh combination method.
Figure 19:
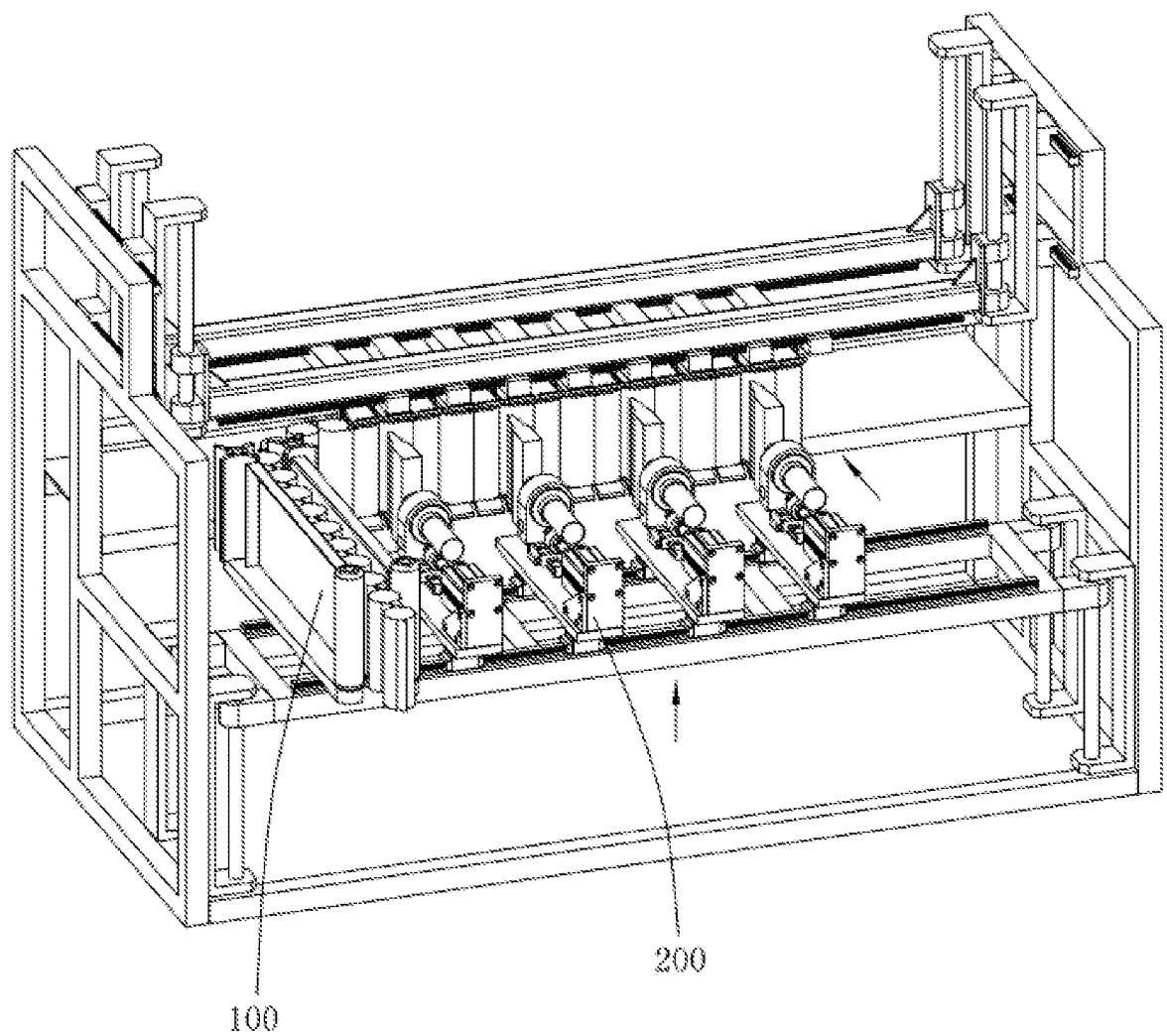
FIG. 19 is a schematic diagram of the movement of the bed mesh combination device according to the embodiment in FIG. 4 when executing the bed mesh combination method, wherein the bed mesh combination device executes step 400 of the bed mesh combination method.
Figure 20:
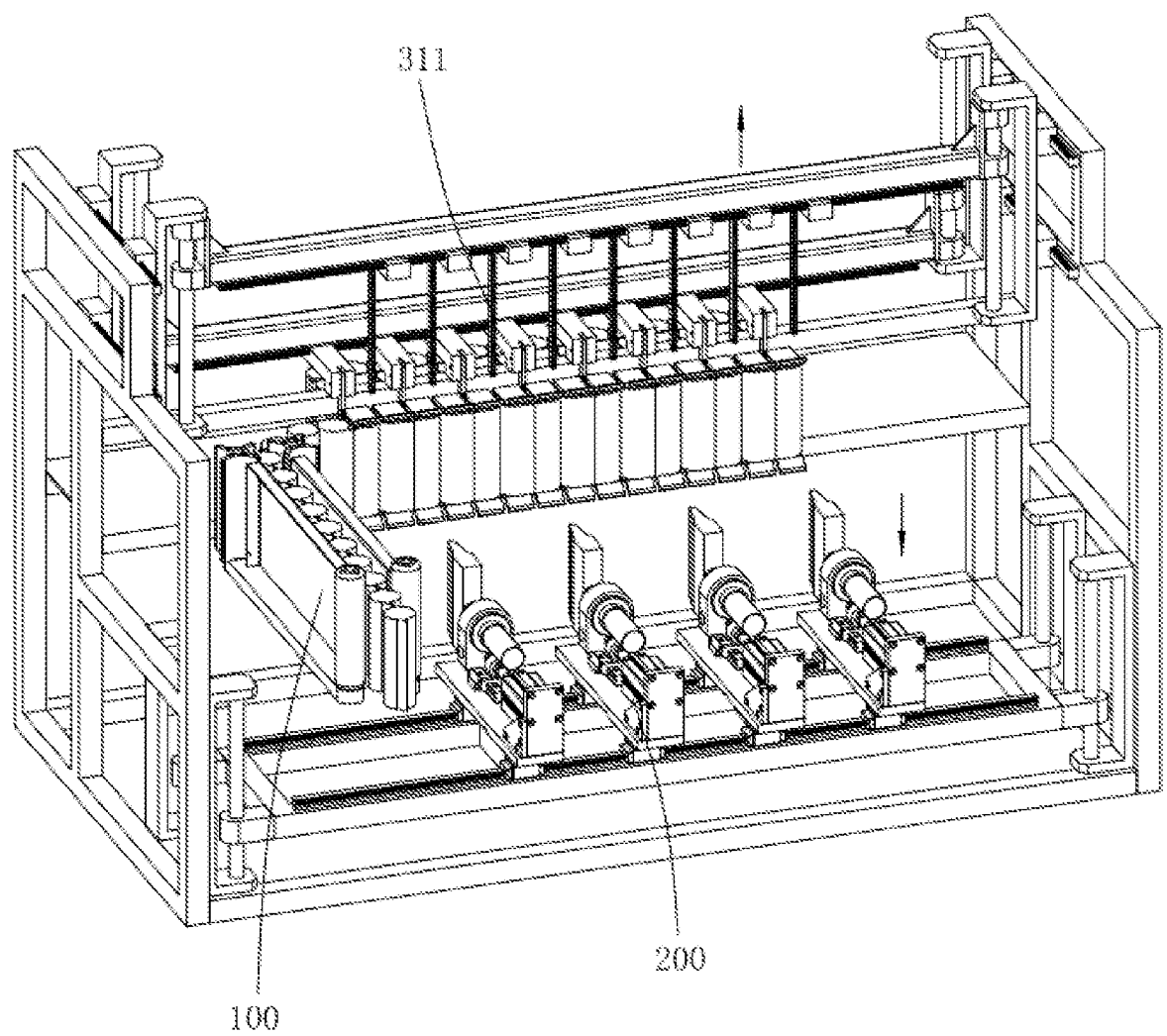
FIG. 20 is a schematic diagram of the movement of the bed mesh combination device according to the embodiment in FIG. 4 when executing the bed mesh combination method, wherein the bed mesh combination device executes step 500 of the bed mesh combination method.
Figure 21:
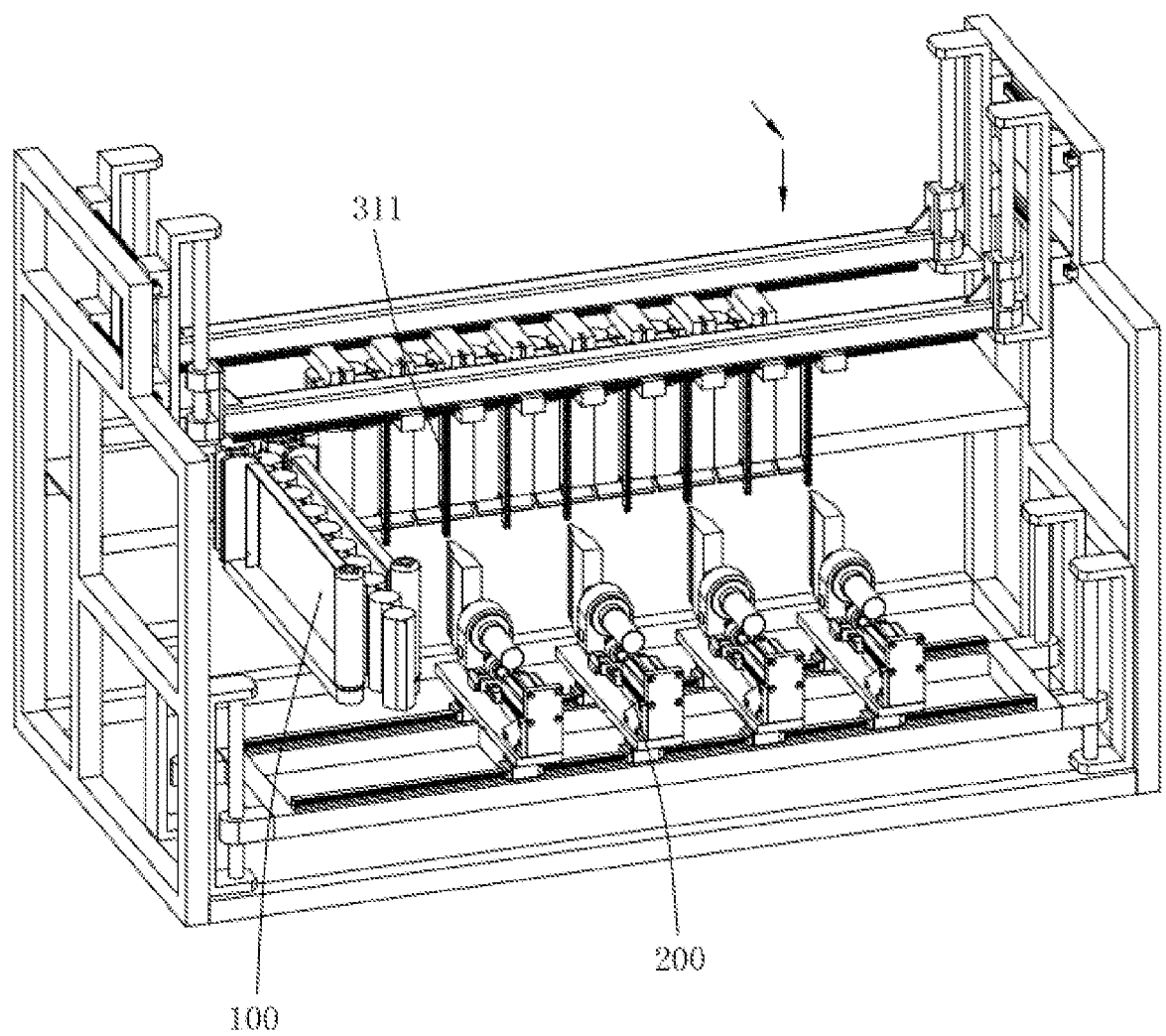
FIG. 21 is a schematic diagram of the movement of the bed mesh combination device according to the embodiment in FIG. 4 when executing the bed mesh combination method, wherein the bed mesh combination device executes step 600 of the bed mesh combination method.
Figure 22:
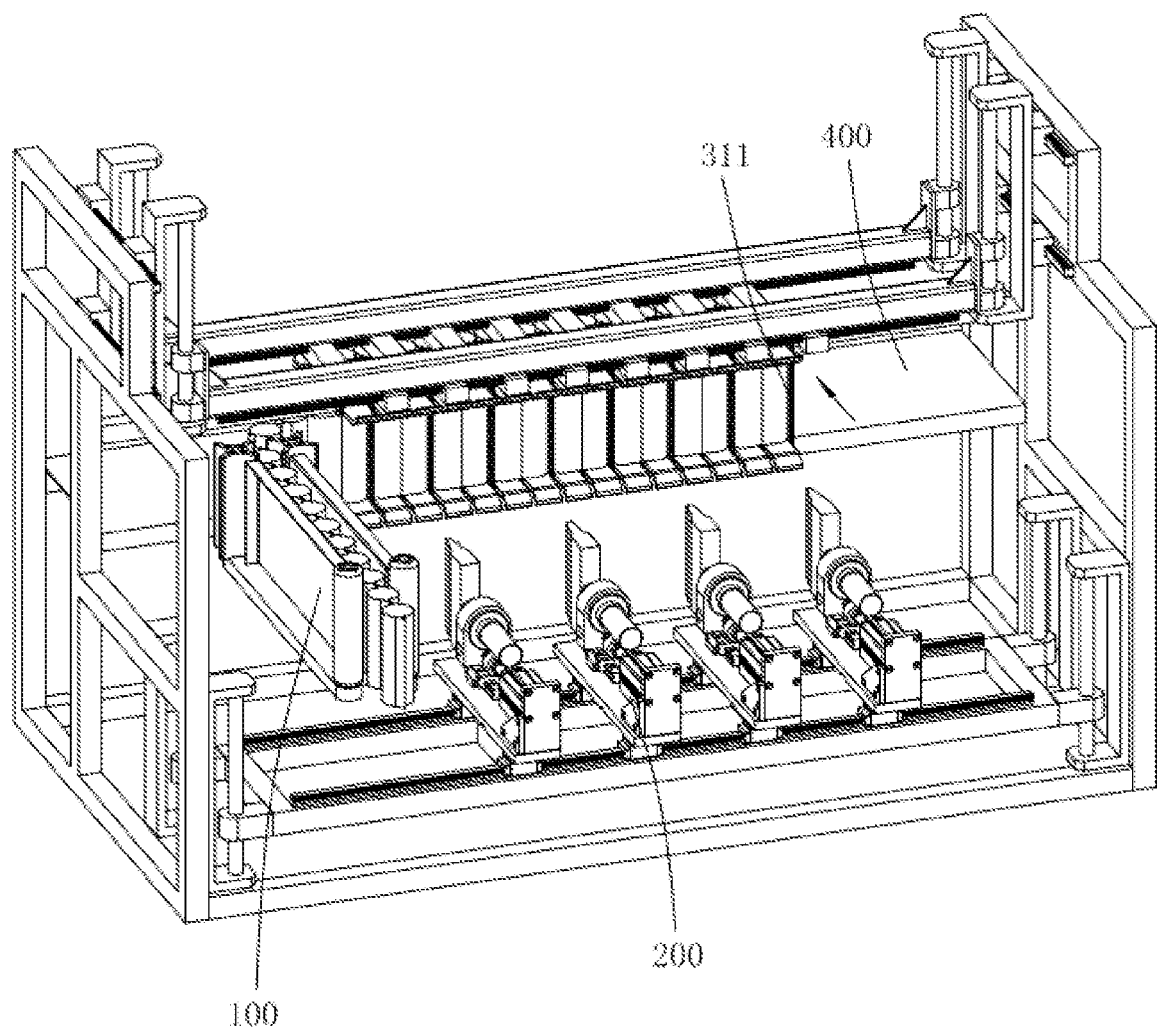
FIG. 22 is a schematic diagram of the movement of the bed mesh combination device according to the embodiment in FIG. 4 when executing the bed mesh combination method, wherein the bed mesh combination device executes step 600 of the bed mesh combination method.
Figure 23:
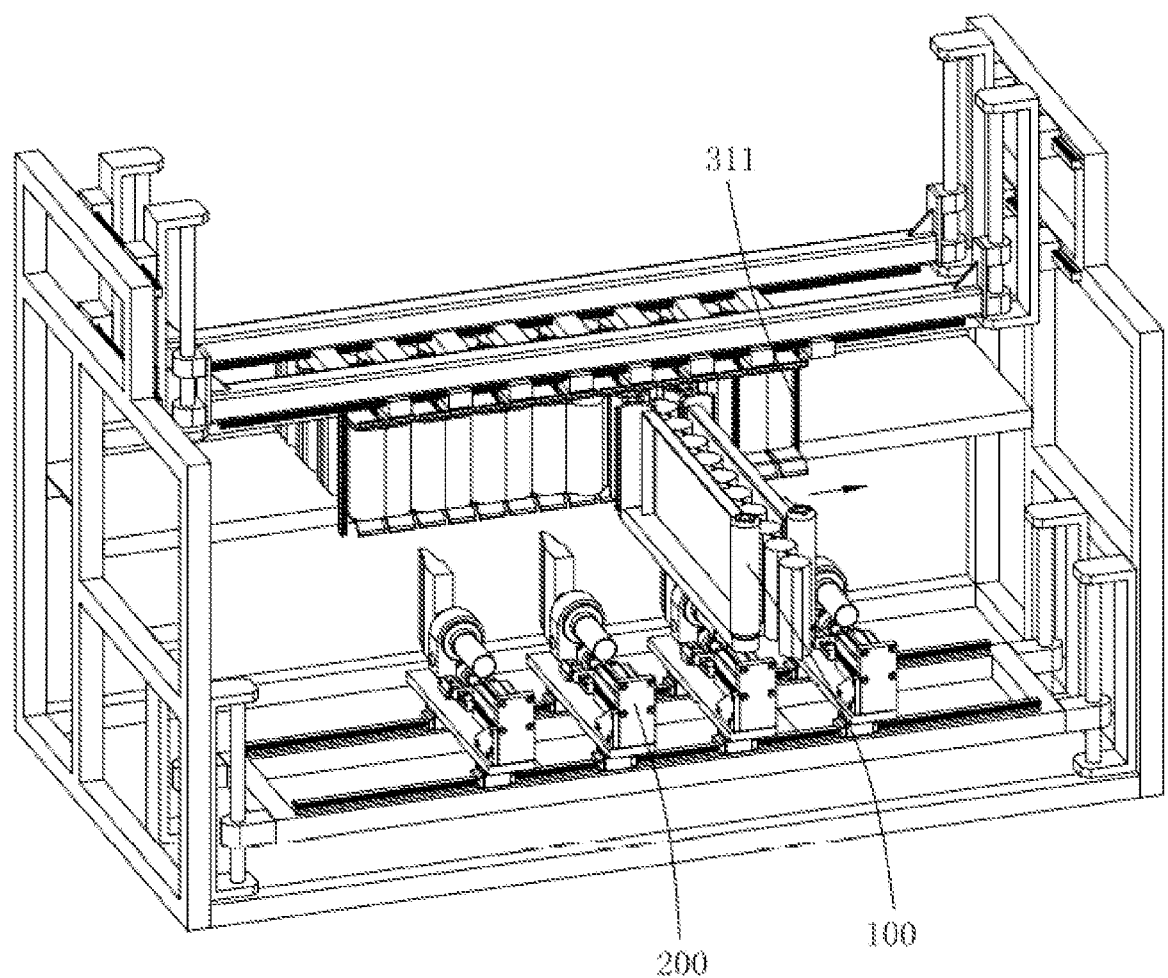
FIG. 23 is a schematic diagram of the movement of the bed mesh combination device according to the embodiment in FIG. 4 when executing the bed mesh combination method, wherein the bed mesh combination device executes step 700 of the bed mesh combination method.
Figure 24:
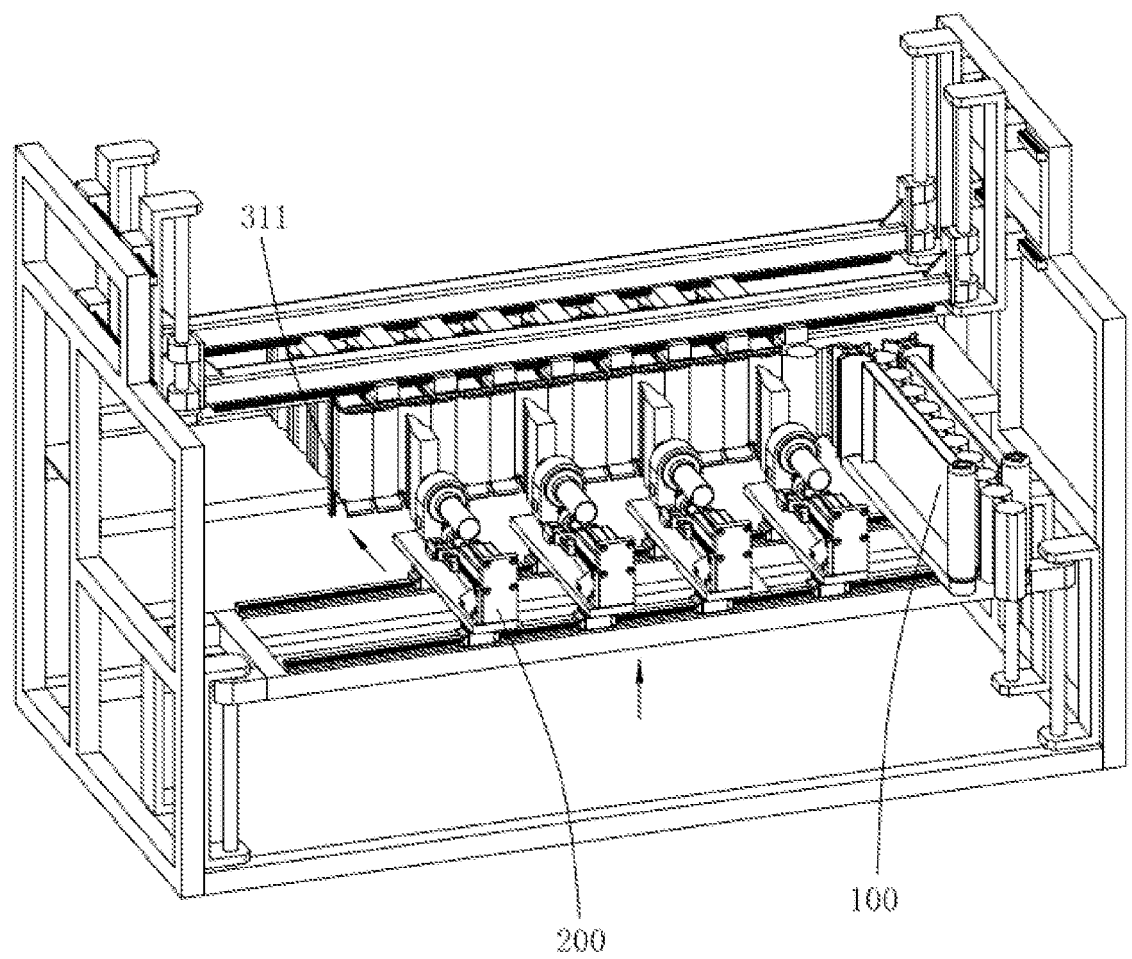
FIG. 24 is a schematic diagram of the movement of the bed mesh combination device according to the embodiment in FIG. 4 when executing the bed mesh combination method, wherein the bed mesh combination device executes step 800 of the bed mesh combination method.

Sequentially referring to FIG. 16 to FIG. 24: firstly referring to FIG. 16, the second welding cutters 312 (which are namely the second group of welding cutters 310) move upward in the third direction to be drawn out from the spring string 900 under driving of the third driving member, then the second welding cutters 312 move forward in the second direction to be in front of the odd-numbered row of spring string 900 under driving of the second driving member 550, and then the second welding cutters 312 reset in the third direction;

then referring to FIG. 17, the second welding cutters 312 move backward in the second direction, and the odd-numbered row of spring string 900 is pressed towards the first welding cutters 311 (which are namely the first group of welding cutters 310), so that positions of the first welding cutters 311 correspond to the welding positions of the odd-numbered row of spring string 900 on one hand, and the odd-numbered row of spring string 900 enters the discharging assembly 400 on the other hand;

then referring to FIG. 18, the feeding assembly 100 and the welding head assembly 200 move to the left along the first direction under driving of the sixth driving member, and the even-numbered row of spring string 900 is laid on the odd-numbered row of spring string 900;

then referring to FIG. 19, the welding head assembly 200 moves to a position corresponding to the first welding cutters 311, the ultrasonic welding heads 210 are pressed towards the first welding cutters 311 in the second direction, and the even-numbered row of spring string 900 is welded on the odd-numbered row of spring string 900;

then referring to FIG. 20, the welding head assembly 200 moves in the third direction for avoidance, and the first welding cutters 311 move upward in the third direction to be drawn out from the spring string 900;

then referring to FIG. 21, the first welding cutters 311 move forward in the second direction to be above the even-numbered row of spring string 900, and reset in the third direction;

then referring to FIG. 22, the first welding cutters 311 move backward in the second direction, and the even-numbered row of spring string 900 is pressed towards the second welding cutters 312, so that positions of the second welding cutters 312 correspond to the welding positions of the even-numbered row of spring string 900 on one hand, and the even-numbered row of spring string 900 enters the discharging assembly 400 on the other hand;

then referring to FIG. 23, the feeding assembly 100 and the welding head assembly 200 move to the right along the first direction under driving of the sixth driving member, and the odd-numbered row of spring string 900 is laid on the even-numbered row of spring string 900; and then referring to FIG. 24, the welding head assembly 200 moves to a position corresponding to the second welding cutters 312, the ultrasonic welding heads 210 are pressed towards the second welding cutters 312 in the second direction, and the odd-numbered row of spring string 900 is welded on the even-numbered row of spring string 900. After welding is completed, the welding head assembly 200 moves in the third direction for avoidance.

In the descriptions of the specification, the descriptions with reference to the terms "one embodiment", "some embodiments", "illustrative embodiment", "example", "specific example" or "some examples", etc., refer to that specific features, structures, materials, or characteristics described with reference to the embodiments or examples are included in at least one embodiment or example of the disclosure. In the specification, the schematic representation of the above terms does not necessarily mean the same embodiment or example. Moreover, the specific features, structures, materials or characteristics described may be combined in any one or more embodiments or examples in a suitable manner.

Although the embodiments of the disclosure have been shown and described, those of ordinary skills in the art should understand that: various changes, amendments, substitutions and modifications can be made to these embodiments without departing from the principles and purposes of the disclosure, and the scope of the disclosure is defined by the claims and equivalents thereof.

What is claimed is:

1. A bed mesh combination device, comprising:
a feeding assembly, wherein the feeding assembly is capable of moving in a first direction, the feeding assembly is configured for conveying a spring string, and the spring string comprises a plurality of bagged springs sequentially connected;
- a welding cutter assembly, wherein the welding cutter assembly and the feeding assembly are oppositely arranged in a second direction, the feeding assembly is capable of laying the spring string on the welding cutter assembly, the welding cutter assembly comprises a plurality of welding cutters, the welding cutters extend in a third direction, two groups of welding cutter assemblies are provided, the welding cutters of a same group are arranged at intervals along the first direction, the welding cutters of different groups are staggered in the first direction, the two groups of welding cutter assemblies are respectively used to correspond to a first welding position and a second welding position of the spring string, the welding cutter assembly is capable of pushing the spring string to move in the second direction, and the welding cutter assembly is capable of reciprocating relative to the spring string in the third direction; and
- a welding head assembly, wherein the welding head assembly comprises an ultrasonic welding head and a first driving member, and the first driving member is configured for driving the ultrasonic welding head to reciprocate relative to the welding cutter in the second direction, so that the ultrasonic welding head and the welding cutter are capable of cooperating to complete welding.

2. The bed mesh combination device of claim 1, wherein at least one of the welding head assemblies is arranged on a side surface of the feeding assembly along the first direction, and the welding head assembly is capable of moving in the first direction.

3. The bed mesh combination device of claim 2, wherein the welding head assembly is provided in two groups, and the two groups of welding head assemblies are respectively arranged on two sides of the feeding assembly along the first direction.

4. The bed mesh combination device of claim 2, wherein the bed mesh combination device comprises a first track, the first track extends along the first direction, the welding head assembly and the feeding assembly are mounted on the first track, and an interval between a plurality of welding head assemblies located on a same side of the feeding assembly is adjustable.

5. The bed mesh combination device of claim 1, wherein the welding head assembly and the feeding assembly are located on a same side of the welding cutter assembly in the second direction, a plurality of ultrasonic welding heads are arranged at intervals along the first direction, and the welding head assembly is capable of moving in the third direction to avoid the feeding assembly.

6. The bed mesh combination device of claim 5, wherein the bed mesh combination device comprises a first track, the first track extends along the first direction, the welding head assembly is mounted on the first track, the welding head assembly comprises a plurality of first mounting seats, the first mounting seats and the first driving members are in one-to-one correspondence to the ultrasonic welding heads, the plurality of first mounting seats are mounted on the first track at intervals, the first driving member and the ultrasonic welding head are mounted on the corresponding first mounting seat, an interval between the ultrasonic welding heads is adjustable, and the first driving members are respectively configured for driving the corresponding ultrasonic welding head to reciprocate relative to the welding cutter.

7. The bed mesh combination device of claim 5, wherein the welding head assembly comprises a first mounting seat, a plurality of ultrasonic welding heads are mounted on the first mounting seats at intervals along the first direction, an interval between the ultrasonic welding heads is adjustable, and the first driving member is configured for driving the ultrasonic welding heads to reciprocate relative to the welding cutter.

8. The bed mesh combination device of claim 5, wherein the bed mesh combination device comprises an eighth driving member, a fifth track and a fifth mounting seat, the fifth track extends along the third direction, the fifth mounting seat is mounted on the fifth track, the eighth driving member is capable of driving the fifth mounting seat to move along the fifth track, and the welding head assembly is movably mounted on the fifth mounting seat.

9. The bed mesh combination device of claim 5, wherein the bed mesh combination device comprises a fifth driving member, and the fifth driving member is configured for driving the welding head assembly to move along the first direction, so that the ultrasonic welding head is capable of complete welding at different positions.

10. The bed mesh combination device of claim 2, wherein the feeding assembly comprises a fourth driving member and conveying members, the conveying members are arranged at intervals in the first direction or the third direction in pairs, a conveying channel is formed between the paired conveying members, at least one of the conveying members is an active member, the active member comprises at least one of a ratchet, a roller or a conveyor belt, and the fourth driving member is configured for driving the active member to convey the spring string.

11. The bed mesh combination device of claim 10, wherein the feeding assembly comprises a limiting member, the limiting member extends in the second direction, and the limiting member and the conveying member jointly form the conveying channel.

12. The bed mesh combination device of claim 2, wherein the bed mesh combination device comprises a second driving member and a third driving member, the second driving member is configured for driving the welding cutter assembly to move along the second direction, and the third driving member is configured for driving the welding cutter assembly to move along the third direction.

13. The bed mesh combination device of claim 2, wherein an interval between the welding cutters is adjustable.

14. The bed mesh combination device of claim 2, wherein the welding cutter assembly comprises a fourth mounting seat, one end of the welding cutter is mounted on the fourth mounting seat, the bed mesh combination device comprises a supporting member, the supporting member is located on an opposite side of a welding surface of the welding cutter, and the supporting member is configured for supporting the other end of the welding cutter.

15. The bed mesh combination device of claim 14, wherein a convex surface oriented to the ultrasonic welding head is formed on the welding cutter, and the convex surface is configured for better fitting the welding cutter deformed by a force with the ultrasonic welding head.

16. The bed mesh combination device of claim 2, wherein the bed mesh combination device comprises a discharging assembly, the discharging assembly comprises a receiving member, the receiving member is located at an opposite side of a welding surface of the welding cutter in the second direction, and the receiving member is configured for receiving the spring string sent by the welding cutter assembly.

17. The bed mesh combination device of claim 16, wherein the bed mesh combination device further comprises a guiding member, the guiding member is arranged on the welding cutter assembly or on the discharging assembly, the guiding member comprises a guiding inclined plane, the guiding inclined plane is inclined to an end surface of the bagged spring in the spring string, and the guiding member is configured for arranging and aligning the spring string in the first direction, and guiding the spring string to move in the second direction.

18. The bed mesh combination device of claim 17, wherein the discharging assembly comprises two groups of receiving members, the bed mesh combination device comprises two groups of guiding members, the two groups of receiving members are arranged at an interval in the third direction, a receiving channel is formed between the two groups of receiving members, the two groups of guiding members are oppositely arranged in the third direction, the guiding inclined plane is partially or wholly located on one side of the welding surface of the welding cutter in the third direction, the two groups of guiding members form a guiding channel with a gradually reduced cross-sectional area, and the guiding member is configured for guiding the spring string to enter the receiving channel.

19. The bed mesh combination device of claim 16, wherein the two groups of welding cutter assemblies are respectively located on two sides of the discharging assembly in the third direction, or the two groups of welding cutter assemblies are located on a same side of the discharging assembly in the third direction.

20. A bed mesh combination method, wherein spring strings are combined into an adhesive-free bed mesh through the bed mesh combination device of claim 2 using the bed mesh combination method, and the bed mesh combination method comprises the following steps:
 step 100: making the feeding assembly move along the first direction, and laying a first row of spring string on a first group of welding cutters;
 step 200: making a second group of welding cutters move to one side of an odd-numbered row of spring string facing towards the feeding assembly and then move along the second direction, and driving the odd-numbered row of spring string to reach a welding station;
 step 300: making the feeding assembly move along the first direction, laying an even-numbered row of spring string on the odd-numbered row of spring string, while sequentially pressing the ultrasonic welding heads towards the first group of welding cutters, and welding first welding positions of the even-numbered row of spring string and the odd-numbered row of spring string by the ultrasonic welding heads and the first group of welding cutters;
 step 400: drawing out the first group of welding cutters from the spring strings;
 step 500: making the first group of welding cutters move to one side of the even-numbered row of spring string facing towards the feeding assembly and then move along the second direction, and driving the even-numbered row of spring string to reach the welding station;
 step 600: making the feeding assembly move along the first direction, laying the odd-numbered row of spring string on the even-numbered row of spring string, while sequentially pressing the ultrasonic welding heads towards the second group of welding cutters, and welding second welding positions of the odd-numbered row of spring string and the even-numbered row of spring string by the ultrasonic welding heads and the second group of welding cutters;
 step 700: drawing out the second group of welding cutters from the spring strings; and
 repeating the step 200 to the step 700, until the spring strings are welded into the bed mesh with a predetermined size.

21. The bed mesh combination method of claim 20, wherein before the step 100, the method further comprises step 10: adjusting the first group of welding cutters, so that the first group of welding cutters correspond to the first welding positions of the spring string in the first direction; and adjusting the second group of welding cutters, so that the second group of welding cutters correspond to the second welding positions of the spring string in the first direction, and in subsequent welding steps, positions of the welding cutters in the first direction remain unchanged.

22. A bed mesh combination method, wherein spring strings are combined into an adhesive-free bed mesh through the bed mesh combination device of claim 5 using the bed mesh combination method, and the bed mesh combination method comprises the following steps:
 step 100: making the feeding assembly move along the first direction, and laying a first row of spring string on a first group of welding cutters;
 step 200: making a second group of welding cutters move to one side of an odd-numbered row of spring string facing towards the feeding assembly and then move along the second direction, and driving the odd-numbered row of spring string to reach a welding station;
 step 300: making the feeding assembly move along the first direction, and laying an even-numbered row of spring string on the odd-numbered row of spring string;
 step 400: making the welding head assembly move to a position corresponding to the first group of welding cutters in the first direction, pressing the ultrasonic welding heads towards the first group of welding cutters along the second direction, and welding first welding positions of the even-numbered row of spring string and the odd-numbered row of spring string by the ultrasonic welding heads and the first group of welding cutters;
 step 500: drawing out the first group of welding cutters from the spring strings;
 step 600: making the first group of welding cutters move to one side of the even-numbered row of spring string facing towards the feeding assembly and then move along the second direction, and driving the even-numbered row of spring string to reach the welding station;
 step 700: making the feeding assembly move along the first direction, and laying the odd-numbered row of spring string on the even-numbered row of spring string;
 step 800: making the welding head assembly move to a position corresponding to the second group of welding cutters in the first direction, pressing the ultrasonic welding heads towards the second group of welding cutters along the second direction, and welding second welding positions of the odd-numbered row of spring string and the even-numbered row of spring string by the ultrasonic welding heads and the second group of welding cutters;
 step 900: drawing out the second group of welding cutters from the spring strings; and
 repeating the step 200 to the step 900, until the spring strings are welded into the bed mesh with a predetermined size.

23. The bed mesh combination method of claim 22, wherein before the step 100, the method further comprises step 10: adjusting the first group of welding cutters, so that the first group of welding cutters correspond to the first welding positions of the spring string in the first direction; and adjusting the second group of welding cutters, so that the second group of welding cutters correspond to the second welding positions of the spring string in the first direction, and in subsequent welding steps, positions of the welding cutters in the first direction remain unchanged.

24. The bed mesh combination method of claim 22, wherein before the welding head assembly moves in the first direction, the welding head assembly moves to a working region along the third direction, and after completing welding, the welding head assembly moves to an avoidance region along the third direction.

25. The bed mesh combination method of claim 22, wherein when a number of the ultrasonic welding heads is less than a number of the first group of welding cutters, the step 400 is repeatedly executed to complete welding of all the first welding positions, and when the number of the ultrasonic welding heads is less than a number of the second group of welding cutters, the step 800 is repeatedly executed to complete welding of all the second welding positions.

\* \* \* \* \*